(12) United States Patent
Ueno et al.

(10) Patent No.: US 11,900,795 B2
(45) Date of Patent: Feb. 13, 2024

(54) PEDESTRIAN DEVICE AND TRAFFIC SAFETY ASSISTANCE METHOD

(71) Applicant: PANASONIC INTELLECTUAL PROPERTY MANAGEMENT CO., LTD., Osaka (JP)

(72) Inventors: Tsuyoshi Ueno, Kanagawa (JP); Masahito Sugahara, Kanagawa (JP); Shintaro Muramatsu, Kanagawa (JP); Yoshiyuki Okubo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 203 days.

(21) Appl. No.: 17/610,864

(22) PCT Filed: May 18, 2020

(86) PCT No.: PCT/JP2020/019581
§ 371 (c)(1),
(2) Date: Nov. 12, 2021

(87) PCT Pub. No.: WO2020/235518
PCT Pub. Date: Nov. 26, 2020

(65) Prior Publication Data
US 2022/0262236 A1    Aug. 18, 2022

(30) Foreign Application Priority Data
May 20, 2019   (JP) .................. 2019-094815

(51) Int. Cl.
*G08G 1/005* (2006.01)
*H04W 4/90* (2018.01)
(Continued)

(52) U.S. Cl.
CPC ......... *G08G 1/005* (2013.01); *B60W 30/0956* (2013.01); *B60W 50/14* (2013.01);
(Continued)

(58) Field of Classification Search
CPC ........ G08G 1/005; G08G 1/166; G08G 1/163; B60W 30/0956; B60W 50/14;
(Continued)

(56) References Cited

U.S. PATENT DOCUMENTS

| 8,953,841 B1 * | 2/2015 | Leblang | ................. G06V 20/20 |
| | | | 382/103 |
| 10,168,792 B2 * | 1/2019 | Yun | ....................... G06F 3/0426 |

(Continued)

FOREIGN PATENT DOCUMENTS

| JP | 2002029346 A | 1/2002 |
| JP | 2004118418 A | 4/2004 |

(Continued)

OTHER PUBLICATIONS

Anaya, Jose et. al., Vehicle to Pedestrian Communications for Protection of Vulnerable Road Users, Jun. 8-11, 2014, 2014 IEEE Intelligent Vehicle Symposium (IV), pp. 1037-1042 (Year: 2014).*

(Continued)

*Primary Examiner* — Eric Blount
(74) *Attorney, Agent, or Firm* — Seed IP Law Group LLP

(57) ABSTRACT

The present invention relates to a pedestrian device and a traffic safety assistance method which can effectively and properly support pedestrian's safety confirmation by utilizing vehicle-to-pedestrian communications and an AR device. A pedestrian device of the present invention includes: an ITS communication device 21 (pedestrian-vehicle communication device) configured to perform vehicle-to-pedestrian communications with an in-vehicle terminal 2; a processor 32 configured to determine if there is a risk of collision based on information transmitted to and received from the in-vehicle device, and control provision of an alert to a user of the pedestrian device; and an AR display 26 for displaying a virtual object overlaid on a real space (Continued)

which can be seen by the user, wherein the processor controls display of the virtual object (virtual terminal) on the AR display as an alert operation to provide an alert to the user.

20 Claims, 14 Drawing Sheets

(51) Int. Cl.
- H04W 4/40 (2018.01)
- G06V 20/20 (2022.01)
- G06V 40/12 (2022.01)
- B60W 30/095 (2012.01)
- B60W 50/14 (2020.01)
- G02B 27/00 (2006.01)
- G02B 27/01 (2006.01)
- G06T 19/00 (2011.01)
- G08G 1/16 (2006.01)

(52) U.S. Cl.
CPC ..... *G02B 27/0093* (2013.01); *G02B 27/0101* (2013.01); *G02B 27/017* (2013.01); *G02B 27/0179* (2013.01); *G06T 19/006* (2013.01); *G06V 20/20* (2022.01); *G06V 40/12* (2022.01); *G08G 1/166* (2013.01); *H04W 4/40* (2018.02); *H04W 4/90* (2018.02); *B60W 2050/146* (2013.01); *B60W 2556/45* (2020.02); *G02B 2027/014* (2013.01); *G02B 2027/0138* (2013.01); *G02B 2027/0187* (2013.01)

(58) Field of Classification Search
CPC ........ B60W 2050/146; B60W 2556/45; G02B 27/0093; G02B 27/0101; G02B 27/017; G02B 27/0179; G02B 2027/0138; G02B 2027/014; G02B 2027/0187; G02B 2027/0141; G02B 2027/0167; G06T 19/006; G06V 20/20; G06V 40/12; H04W 4/40; H04W 4/90; G06F 3/011
USPC .......................................................... 340/944
See application file for complete search history.

(56) References Cited

U.S. PATENT DOCUMENTS

| | | | |
|---|---|---|---|
| 10,172,409 B1* | 1/2019 | Andon | A43B 3/34 |
| 10,621,858 B1* | 4/2020 | DeCastro | G02B 27/017 |
| 2005/0073438 A1* | 4/2005 | Rodgers | G08G 1/161 |
| | | | 340/944 |
| 2010/0217483 A1* | 8/2010 | Matsuno | G08G 1/166 |
| | | | 701/36 |
| 2012/0194554 A1* | 8/2012 | Kaino | G08B 13/19613 |
| | | | 345/633 |
| 2014/0354684 A1* | 12/2014 | Beckwith | G06F 3/011 |
| | | | 345/633 |
| 2015/0035685 A1* | 2/2015 | Strickland | B60Q 9/008 |
| | | | 340/901 |
| 2015/0109148 A1* | 4/2015 | Cheatham, III | G01S 11/12 |
| | | | 340/944 |
| 2015/0109149 A1* | 4/2015 | Duncan | G02B 27/01 |
| | | | 340/944 |
| 2016/0048230 A1* | 2/2016 | Shimoda | H04N 13/156 |
| | | | 345/633 |
| 2017/0092126 A1* | 3/2017 | Oshida | G08G 1/005 |
| 2017/0345292 A1* | 11/2017 | Haran | G08G 1/166 |
| 2018/0033306 A1* | 2/2018 | Kim | G06V 40/103 |
| 2018/0061234 A1* | 3/2018 | Nagasawa | G06V 40/103 |
| 2018/0197412 A1* | 7/2018 | Uchiyama | G08G 1/012 |
| 2018/0233048 A1* | 8/2018 | Andersson | G08G 1/0112 |
| 2019/0129038 A1* | 5/2019 | Goeltner | G08G 1/005 |
| 2020/0189467 A1* | 6/2020 | Kondo | G06T 11/00 |
| 2020/0349843 A1* | 11/2020 | Liu | G08G 1/005 |

FOREIGN PATENT DOCUMENTS

| | | | |
|---|---|---|---|
| JP | 2006-268475 A | | 10/2006 |
| JP | 2006268475 A | * | 10/2006 |
| JP | 2010188981 A | | 9/2010 |
| JP | 2012-155655 A | | 8/2012 |
| JP | 5346115 B | | 8/2013 |
| JP | 2014-142798 A | | 8/2014 |
| JP | 2014142798 A | * | 8/2014 |
| JP | 2018-032241 A | | 3/2018 |
| JP | 2019041334 A | | 3/2019 |
| WO | 2014/156706 A1 | | 10/2014 |
| WO | 2019/069554 A1 | | 4/2019 |

OTHER PUBLICATIONS

Wu, Xinshou, Cars Talk to Phones: A DSRC Based Vehicle-Pedestrian Safety System, 2014, IEEE (Year: 2014).*

Office Action, dated May 30, 2023, for Japanese Patent Application No. 2019-094815. (9 pages) (with English Translation).

International Search Report dated Aug. 11, 2020 for International Application No. PCT/JP2020/019581, 3 pages.

* cited by examiner

Fig.5
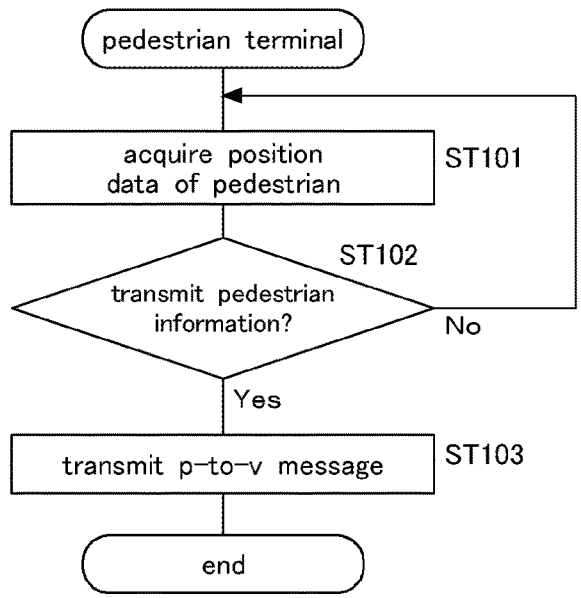
(A)
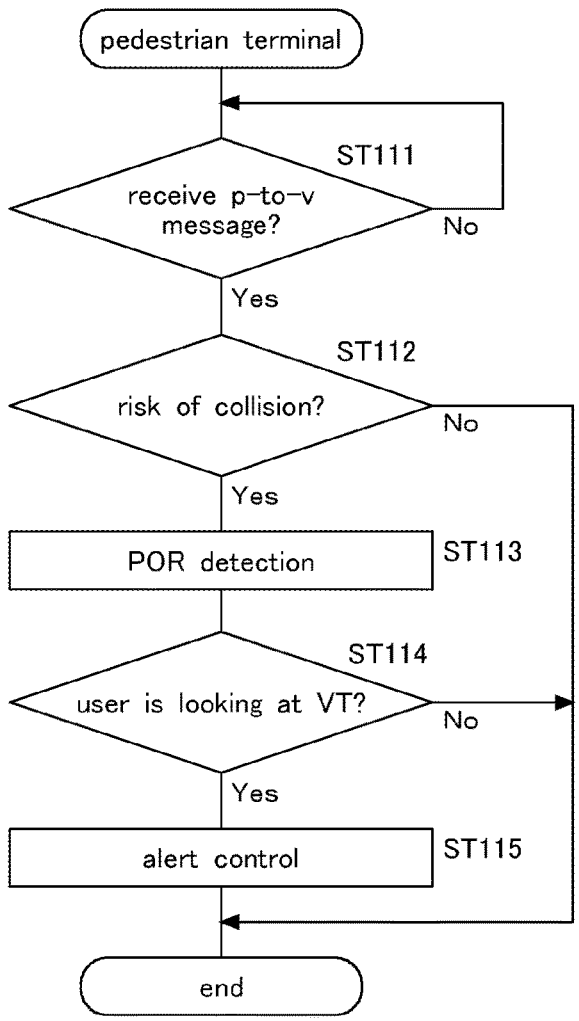
(B)

PEDESTRIAN DEVICE AND TRAFFIC SAFETY ASSISTANCE METHOD

TECHNICAL FIELD

The present disclosure relates to a pedestrian device for exchanging information with an in-vehicle device to support safety of a pedestrian and a vehicle, and a traffic safety assistance method utilizing the pedestrian device.

BACKGROUND ART

Recently, the dangers of using a mobile phone or a music player while walking have been an increasing problem. When using a mobile device while walking, pedestrians become less alert to their surroundings and fail to sufficiently confirm safety, which often leads to an accident caused by failure to notice a dangerous situation they are facing.

In addition, various technologies to realize AR (Augmented Reality) have been proposed in recent years. Such AR technologies overlay and display a virtual object on a real space which can be seen by a person, and can effectively support various actions taken by the person.

Known technical ideas using such AR technologies include systems for providing an alert to pedestrians to support actions taken by them (See Patent Documents 1 and 2). Another known technology is a system for providing a function of a pacemaker for walking or providing evacuation guidance in times of disaster (See Patent Document 3).

PRIOR ART DOCUMENT (S)

Patent Document(s)

Patent Document 1: JP2012-155655A
Patent Document 2: JP2012-155654A
Patent Document 3: JP5346115B

SUMMARY OF THE INVENTION

Task to be Accomplished by the Invention

In recent years, various AR devices such as head mount displays have been developed. Such AR devices, which can implement advanced ARs, are expected to be utilized to effectively support pedestrian's safety confirmation.

However, safety systems of the prior art, which are configured to detect a dangerous situation based on object recognition in images captured by cameras, have a problem of inability to accurately detect dangerous situations and properly provide an alert to a pedestrian.

Furthermore, safe driving assistance wireless systems utilizing ITS (Intelligent Transport System) have been proposed in recent years, and such systems utilize vehicle-to-pedestrian communications between a pedestrian terminal carried by a pedestrian and an in-vehicle terminal mounted in a vehicle to prevent pedestrians' accidents. A pedestrian terminal of such systems, which utilize vehicle-to-pedestrian communications, can directly communicate with an in-vehicle terminal to accurately determine if there is a risk of collision with the vehicle, thereby providing a necessary alert to the pedestrian in a timely manner.

The present disclosure has been made in view of the problem of the prior art, and a primary object of the present invention is to provide a pedestrian device and a traffic safety assistance method which can effectively and properly support pedestrian's safety confirmation by utilizing vehicle-to-pedestrian communications and an AR device.

Means to Accomplish the Task

An aspect of the present disclosure provides a pedestrian device comprising: a pedestrian-vehicle communication device for exchanging information with an in-vehicle device mounted in a vehicle via vehicle-to-pedestrian communications; an AR display for displaying a virtual object(s) overlaid on a real space which can be seen by a user of the pedestrian device; and a processor configured to: determine if there is a risk of collision with the vehicle based on the information transmitted to and received from the in-vehicle device; and when determining that there is a risk of collision, control display of the virtual object(s) on the AR display as an alert operation to provide an alert to the user.

Another aspect of the present disclosure provides a traffic safety assistance method for exchanging information between a pedestrian device and an in-vehicle device to support safety of a pedestrian and a vehicle, wherein the pedestrian device determines if there is a risk of collision between the vehicle and the pedestrian based on information transmitted to and received from the in-vehicle device, and when determining that there is a risk of collision, the pedestrian device controls display of a virtual object on an AR display, wherein the AR display displays the virtual object overlaid on a real space which can be seen by a user of the pedestrian device.

Effect of the Invention

A pedestrian device and a method using the pedestrian device of the present disclosure can accurately determine if there is a risk of collision based on information transmitted to and received from an in-vehicle device to thereby provide a necessary alert to a user (pedestrian) in a timely manner. The device and the method also can effectively provide an alert to the user through controlling display of a virtual object on an AR display. As a result, it becomes possible to effectively and properly support pedestrian's safety confirmation.

BRIEF DESCRIPTION OF THE DRAWINGS

FIG. 5 is a flow chart showing an operation procedure of processing operations performed in the pedestrian terminal 1 according to the first embodiment;

DESCRIPTION OF THE PREFERRED EMBODIMENT(S)

Figure 1:
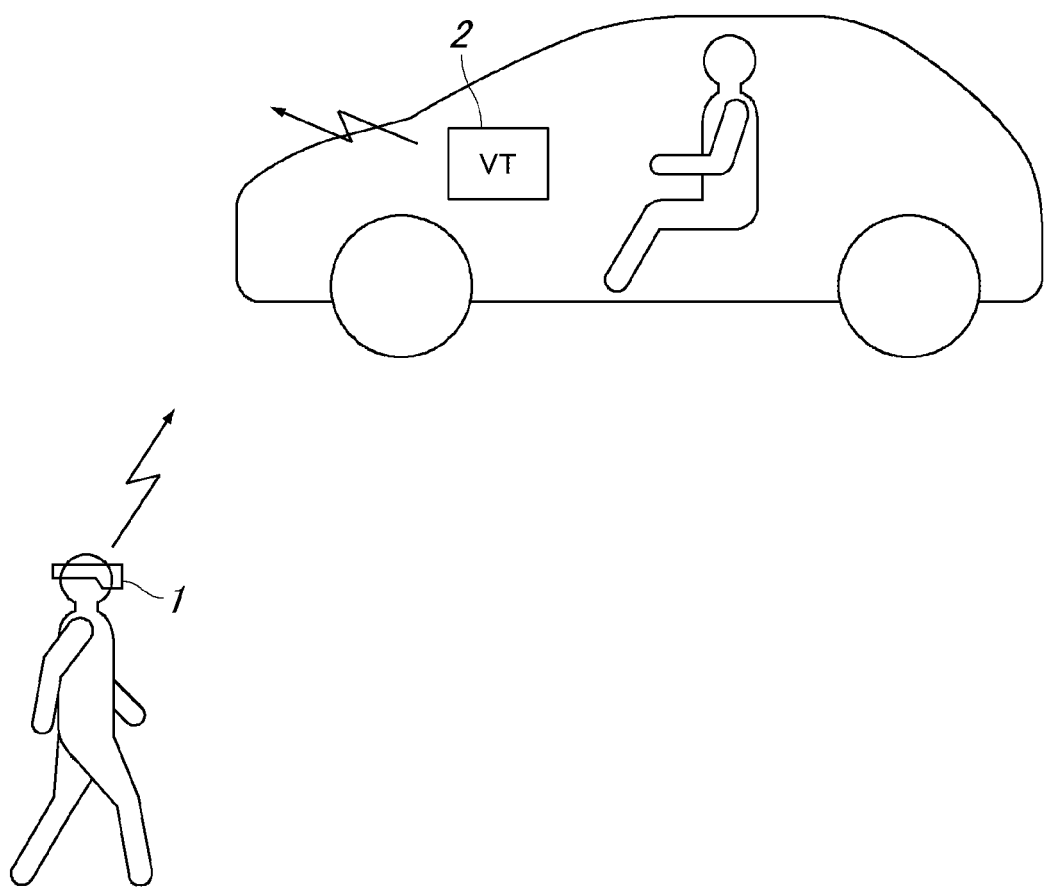
FIG. 1 is a diagram showing a general configuration of a traffic safety assistance system according to a first embodiment of the present invention.

A first aspect of the present invention made to achieve the above-described object is a pedestrian device comprising: a pedestrian-vehicle communication device for exchanging information with an in-vehicle device mounted in a vehicle via vehicle-to-pedestrian communications; an AR display for displaying a virtual object(s) overlaid on a real space which can be seen by a user of the pedestrian device; and a processor configured to: determine if there is a risk of collision with the vehicle based on the information transmitted to and received from the in-vehicle device; and when determining that there is a risk of collision, control display of the virtual object(s) on the AR display as an alert operation to provide an alert to the user.

This configuration can accurately determine if there is a risk of collision based on information transmitted to and received from an in-vehicle device to thereby provide a necessary alert to a user (pedestrian) in a timely manner. This configuration also can effectively provide an alert to the user through controlling display of a virtual object on an AR display. As a result, it becomes possible to effectively and properly support pedestrian's safety confirmation.

A second aspect of the present invention is the pedestrian device of the first aspect, further comprising a field-of-view camera for capturing the user's field of view, wherein the processor is configured to: detect a palm and a fingertip of the user from an image captured by the field-of-view camera; display a virtual terminal as the virtual object at a position of the user's palm; and detect the user's screen operation on the virtual terminal based on positions of the fingertip of the user, and control a screen displayed on the virtual terminal in response to the screen operation.

This configuration displays the virtual terminal such that the user feels as if it were disposed on the user's palm, enabling the user to use it as if the user held a real terminal (such as a smartphone) in the hand, which improves usability of the virtual terminal.

A third aspect of the present invention is the pedestrian device of the second aspect, further comprising a line-of-sight camera for capturing an eyeball of the user, wherein the processor is configured to: acquire position data of a point of regard of the user from an image captured by the line-of-sight camera; determine whether or not the user is looking at the virtual terminal based on the position data of the point of regard; when determining that there is a risk of collision and that the user is looking at the visual terminal, performs the alert operation to provide an alert to the user.

When the user (pedestrian) is looking at the virtual terminal and thus the user becomes less alert to their surroundings, this configuration can provide an alert to the user, thereby more effectively supporting pedestrian's safety confirmation.

A fourth aspect of the present invention is the pedestrian device of the first aspect, wherein the processor is configured to, when determining that there is a risk of collision, predict a collision point where the collision is predicted to occur, and display a mark image representing the collision point as the virtual object.

This configuration enables the user (pedestrian) to recognize the collision point; that is, a point at which the collision between the user and the vehicle is predicted to occur.

A fifth aspect of the present invention is the pedestrian device of the first aspect, wherein the processor is configured to, when determining that there is a risk of collision, predict a collision scene and display simulated images of a pedestrian and a vehicle included in the collision scene as the virtual objects.

This configuration enables the user (pedestrian) to recognize the collision scene; that is, a predicted situation in which the collision between the user and the vehicle occurs.

A sixth aspect of the present invention is the pedestrian device of the first aspect, wherein the processor is configured to display at least one of a mark image and a simulated image representing a position of a vehicle having a risk of collision as the virtual object(s).

This configuration enables the user (pedestrian) to recognize the position of a vehicle having a risk of collision.

A seventh aspect of the present invention is the pedestrian device of the first aspect, wherein, when detecting that the user has gotten in a vehicle as a driver, the processor transitions to an in-vehicle terminal mode and controls the display of the virtual object(s) so as to support safe driving of the driver.

This configuration can support safe driving of the user (driver).

An eighth aspect of the present invention is the pedestrian device of the seventh aspect, wherein the pedestrian-vehicle communication device is configured to receive information on a direction of line of sight of s nearby pedestrian from a pedestrian device carried by the nearby pedestrian, and wherein the processor is configured to display an image representing the direction of the line of sight of the nearby pedestrian as the virtual object based on the information on the direction of the line of sight of the nearby pedestrian.

This configuration displays an image representing the direction of the line of sight of the nearby pedestrian (e.g., an image indicating the nearby pedestrian's point of regard) as the virtual object, thereby enabling the user (driver) to easily recognize in which direction the nearby pedestrian is looking.

A ninth aspect of the present invention is the pedestrian device of the seventh aspect, wherein the processor is configured to display at least one of a mark image and a simulated image representing a position of a pedestrian having a risk of collision as the virtual object(s).

This configuration enables the user (driver) to easily recognize the position of a pedestrian having a risk of collision.

A tenth aspect of the present invention is the pedestrian device of the first aspect, wherein the pedestrian-vehicle communication device is configured to receive information on a direction of line of sight of a driver of a nearby vehicle from the in-vehicle device mounted therein, and wherein the processor is configured to display an image representing the direction of the line of sight of the nearby driver as the virtual object based on the information on the direction of the line of sight of the nearby driver.

This configuration displays an image representing the direction of the line of sight of the nearby driver (e.g., an image indicating the driver's point of regard) as the virtual object, thereby enabling the user (pedestrian) to easily recognize in which direction the nearby driver is looking.

An eleventh aspect of the present invention is a traffic safety assistance method for exchanging information between a pedestrian device and an in-vehicle device to support safety of a pedestrian and a vehicle, wherein the pedestrian device determines if there is a risk of collision between the vehicle and the pedestrian based on information transmitted to and received from the in-vehicle device, and when determining that there is a risk of collision, the pedestrian device controls display of a virtual object on an AR display, wherein the AR display displays the virtual object overlaid on a real space which can be seen by a user of the pedestrian device.

This configuration can effectively and properly support pedestrian's safety confirmation in the same manner as the first aspect.

Embodiments of the present disclosure will be described below with reference to the drawings.

First Embodiment

FIG. 1 is a diagram showing a general configuration of a traffic safety assistance system according to a first embodiment of the present invention.

The traffic safety assistance system is used for supporting safety of a pedestrian(s) and a vehicle(s), and includes a pedestrian terminal(s) 1 (pedestrian device(s)) and an in-vehicle terminal(s) 2 (in-vehicle device(s)).

A pedestrian terminal 1 and an in-vehicle terminal 2 perform ITS communications (pedestrian-to-vehicle communications) with each other. ITS communications are performed using frequency bands adopted by ITS-based (i.e., using Intelligent Transport System) safe driving assistance wireless systems (for example, 700 MHz band or 5.8 GHz band).

The pedestrian terminal 1 is configured to be carried by a pedestrian. The pedestrian terminal 1 transmits and receives messages including position data to and from an in-vehicle terminal 2 mounted in a vehicle through ITS communications (pedestrian-to-vehicle communications), and determines if there is a risk of collision between the pedestrian and the vehicle. When determining that there is a risk of collision, the pedestrian terminal 1 provides an alert to the pedestrian. In the present embodiment, the pedestrian terminal 1 is configured as a head-mounted display to be attached to the head of a pedestrian, and serves to implement AR (Augmented Reality).

The in-vehicle terminal 2 is configured to be mounted in a vehicle. The in-vehicle terminal 2 transmits and receives messages including position data to and from the pedestrian terminal 1 through ITS communications (pedestrian-to-vehicle communications), and determines if there is a risk of collision between the pedestrian and the vehicle. When determining that there is a risk of collision, the in-vehicle terminal 2 provides an alert to the driver. Preferably, the in-vehicle terminal uses a car navigation device to provide an alert to the driver.

Figure 2:
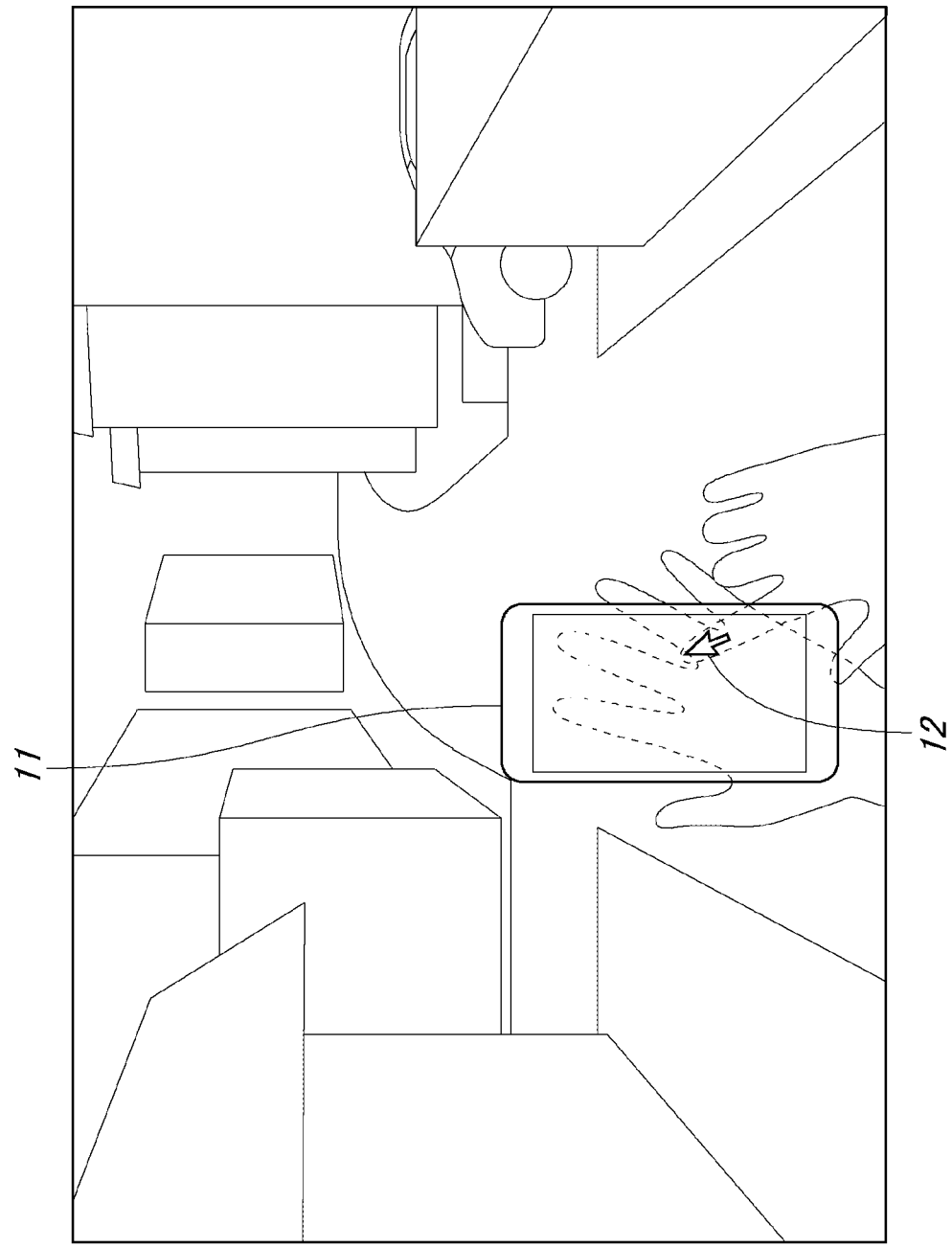
FIG. 2 is an explanatory diagram showing AR contents displayed on a pedestrian terminal 1 according to the first embodiment.

Next, AR contents displayed on the pedestrian terminal 1 will be described. FIG. 2 is an explanatory diagram showing AR contents displayed on the pedestrian terminal 1.

In the present embodiment, the AR display 26 displays, as a virtual object in AR, an image 11 of a virtual smartphone (virtual terminal) such that a user feels as if it were disposed on the palm of the user (pedestrian). Furthermore, a pointer image 12 is included in AR at a position corresponding to the fingertip of the user. When the user performs an operation as if the user touched a screen of the virtual smartphone with a fingertip, the pedestrian terminal 1 recognizes it and controls the screen of the virtual smartphone based on the user's screen operation. In this way, the user can use smartphone applications (such as mailers, browsers, telephone, game apps) as if the user actually held and operated a real smartphone.

In the present embodiment, when there is a risk of collision, the pedestrian terminal 1 prohibits the use of applications (such as mailers, browsers, telephone, game apps) as an alert operation and displays an alert screen on the virtual smartphone. The alert screen indicates alerting characters (for example, "collision alert") and figures. When the risk of collision disappears, the pedestrian terminal 1 closes the alert screen and allows applications to be used so that the user can use applications again.

In the present embodiment, when there is a risk of collision, the pedestrian terminal 1 displays an alert screen on the virtual smartphone in AR as an alert operation. In other embodiments, the pedestrian terminal 1 may stop displaying the virtual smartphone in such cases.

In the present embodiment, the pedestrian terminal 1 displays a virtual smartphone as a virtual object. However, the virtual object may be another display device, such as a tablet terminal. Furthermore, the pedestrian terminal 1 may display only a screen as a virtual object without displaying the main body part of a display device such as a smartphone.

In the present embodiment, the pedestrian terminal 1 displays a virtual smartphone as if it were disposed on the palm of a pedestrian and the pedestrian held it. However, the pedestrian terminal 1 may display a screen of the virtual smartphone as a virtual object at a proper position (such as a position in the lower part of the field of view), regardless of the position of the pedestrian's hand, so that the virtual object does not interfere with the pedestrian's walking.

In the present embodiment, the pedestrian terminal 1 displays an alert screen on the virtual smartphone as an alert operation, thereby notifying a user that the user is in a dangerous situation. In some cases, while an alert screen is displayed, the pedestrian terminal 1 may display an image of the user's surroundings on the virtual smartphone in response to a predetermined operation performed by the user (for example, a hand gesture action). As a result, the user can clearly recognize the situation around the user.

Figure 3:
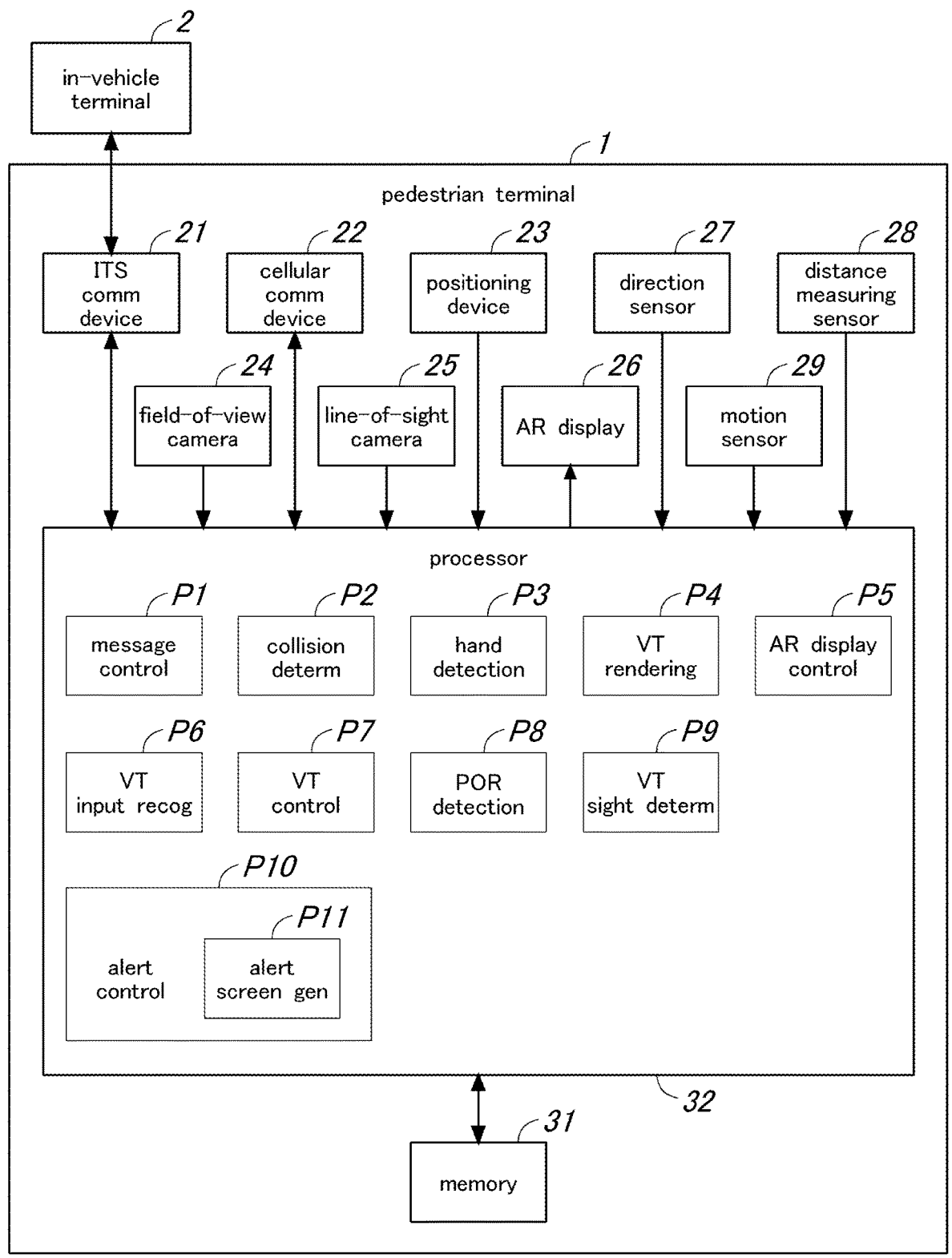
FIG. 3 is a block diagram showing a schematic configuration of the pedestrian terminal 1 according to the first embodiment.
Figure 4:
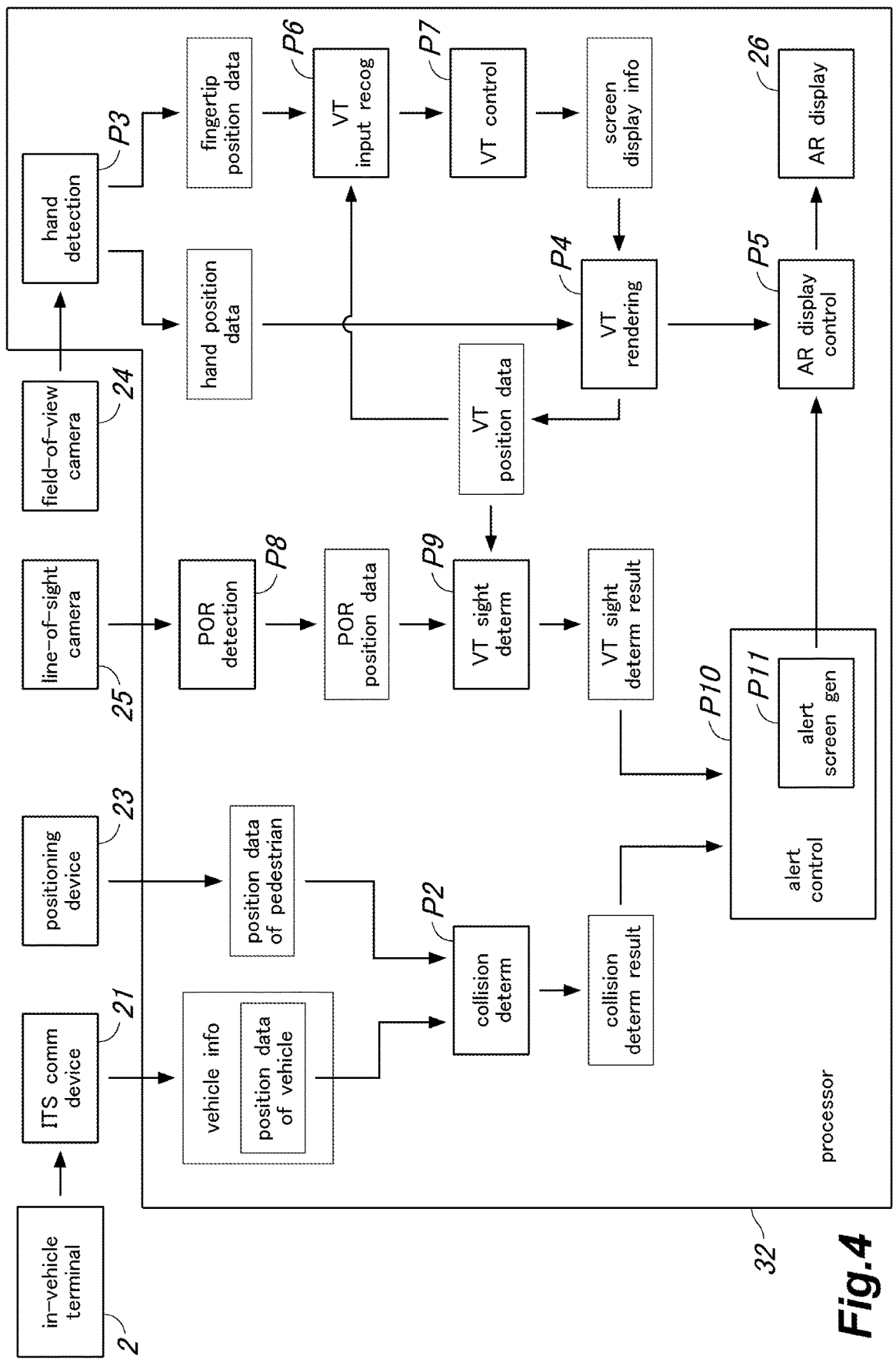
FIG. 4 is an explanatory diagram showing an outline of processing operations performed by a processor 32 of the pedestrian terminal 1 according to the first embodiment.

Next, a schematic configuration of the pedestrian terminal 1 according to the first embodiment will be described. FIG. 3 is a block diagram showing a schematic configuration of the pedestrian terminal. FIG. 4 is an explanatory diagram showing an outline of processing operations performed by a processor 32 of the pedestrian terminal 1.

As shown in FIG. 3, the pedestrian terminal 1 includes an ITS communication device 21 (pedestrian-to-vehicle communication device), a cellular communication device 22, a positioning device 23, a field-of-view camera 24, a line-ofsight camera 25, an AR display 26, a direction sensor 27, a distance measuring sensor 28, a motion sensor 29, a memory 31, and a processor 32.

The ITS communication device 21 (pedestrian-to-vehicle communication device) transmits and receives a message to and from the in-vehicle terminal 2 through ITS communications (pedestrian-to-vehicle communications).

The cellular communication device 22 communicates with a base station(s) which forms a cellular communication network, and with a server(s) which provides services associated with smartphone applications (mailers, browsers, telephone, and game apps) via a network connected to the base station(s).

The positioning device 23 measures the position of the pedestrian terminal itself by using a satellite positioning system such as GPS or QZSS, to thereby acquire the pedestrian terminal's position data (latitude, longitude).

The field-of-view camera 24 shoots an area of a front field of view of a user.

The line-of-sight camera 25 shoots the left and right eyeballs of a user.

The AR display 26 implements an AR (Augmented Reality) by overlaying a virtual object on a real space in a user's real field of view. The AR display 26 may be of either an optical transmissive type display or a video transmissive type display. The optical transmissive type AR display displays a virtual object on a see-through display, while still allowing sight of the outside world through the display. The video transmissive type AR display displays images of a field of view of a viewer together with a virtual object on a non-transparent display, allowing the viewer to virtually see the outside world through the display. The optical transmissive type AR display may be based not only on a see-through type display, but also on a retinal projector type display.

The direction sensor 27 detects the geomagnetic direction. From a detection result of the direction sensor 27, the pedestrian terminal 1 can acquire the head orientation (face orientation) of a user who wears the pedestrian terminal 1.

The distance measuring sensor 28 measures the distance to an opposite object. The distance measuring sensor 28 may adopt, for example, a PSD (Position Sensitive Detector) type configuration. In the PSD configuration, a light emitting element emits light, which is reflected by an object, a light receiving element detects the reflected light, and the distance measuring sensor 28 measures the distance to the object based on the angle of incidence of the reflected light, which changes with the distance to the object.

The motion sensor 29 is composed primarily of an acceleration sensor and a gyro sensor, and used to detect the movement of the user's head.

The memory 31 stores programs executable by the processor 32, and other information.

The processor 32 performs various processing operations for supporting a pedestrian by executing programs stored in the memory 31. In the present embodiment, the processor 32 performs a message control operation P1, a collision determination operation P2, a hand detection operation P3, a virtual terminal rendering operation P4, an AR display control operation P5, a virtual terminal input recognition operation P6, a virtual terminal control operation P7, a point of regard detection operation P8, a virtual terminal sight determination operation P9, and an alert control operation P10.

In the message control operation P1, the processor 32 controls the transmission and reception of messages to and from the in-vehicle terminal 2 through pedestrian-to-vehicle communications.

As shown in FIG. 4, in the collision determination operation P2, the processor 32 determines whether or not there is a risk that the vehicle may collide with the pedestrian based on the vehicle position data included in vehicle information acquired from the in-vehicle terminal 2 and the pedestrian position data acquired by the positioning device 23, and other information. Specifically, the processor 32 generates prediction circles representing the predicted mobility areas of the pedestrian and the vehicle, respectively, and determines whether or not there is a risk of collision based on the overlapping between the prediction circles for the pedestrian and the vehicle.

In the hand detection operation P3, the processor 32 detects the palm and fingertips of the pedestrian based on the images captured by the field-of-view camera 24, and acquires the position data of the pedestrian's palm and fingertips.

In the virtual terminal rendering operation P4, the processor 32 generates rendering data of a virtual smartphone to be displayed in AR. Specifically, the processor 32 generates rendering data of a virtual smartphone based on screen display information generated in the virtual terminal control operation P7. In addition, the processor 32 determines a display position of the virtual smartphone based on the position data of the user's palm acquired in the hand detection operation P3.

In the AR display control operation P5, the processor 32 displays AR contents. Specifically, the processor 32 controls the AR display 26 to display a virtual object overlaid on a real space which can be seen by a user. In the present embodiment, the processor 32 displays the image 11 of a virtual smartphone in AR so as to be overlaid on the palm of the user. Furthermore, based on the position data of as fingertip of the user acquired in the hand detection operation P3, the processor 32 displays a pointer image 12 in AR, the pointer image corresponding to the position of the fingertip with which a user performs an operation as if the user touched a screen of the virtual smartphone.

In the virtual terminal input recognition operation P6, the processor 32 recognizes user's operations on the virtual smartphone based on the position of the user's fingertip acquired in the hand detection operation P3 and the position of the screen of the virtual smartphone displayed in AR. Specifically, the processor 32 detects that a user's touch operation on the screen based on the positional relationship between the screen of the virtual smartphone and the user's fingertip.

In the virtual terminal control operation P7, the processor 32 controls the virtual smartphone based on operation information acquired in the virtual terminal input recognition operation P6. Specifically, the processor 32 executes programs of the OS and applications (such as mailers, browsers, telephone, game apps) of the virtual smartphone. As a result, functions equivalent to those of a real smartphone can be implemented in the virtual smartphone.

In the point of regard detection operation P8, the processor 32 detects the user's point of regard based on images captured by the line-of-sight camera 25, and acquires the position data of the user's point of regard; that is, the coordinate values of the point of regard in a coordinate system of the user's field of view.

In the virtual terminal sight determination operation P9, the processor 32 determines whether or not the user is looking at the virtual smartphone based on the position data of the user's point of regard acquired in the point of regard detection operation P8 and the position data of the virtual smartphone acquired in the virtual terminal rendering operation P4. Specifically, when the position of the user's point of regard substantially matches that of the screen of the virtual smartphone, the processor 32 determines that the user is looking at the virtual smartphone.

When determining that there is a risk of collision in the collision determination operation P2 and also determining that the user is looking at the virtual smartphone in the virtual terminal sight determination operation P9, the processor 32 performs controls for a predetermined alert operation to the user in the alert control operation P10. In the present embodiment, the processor 32 performs an alert screen generation operation P11 as the alert operation. In the alert screen generation operation P11, the processor 32 generates rendering data of an alert screen to be displayed on the virtual smartphone. In the AR display control operation P5, the processor 32 displays the alert screen on the virtual smartphone based on the rendering data of the alert screen acquired in the alert screen generation operation P11.

The pedestrian terminal 1 may be comprised primarily of a head mount portion to be mounted on the head of a user and a main body portion carried by the user. In this case, the field-of-view camera 24, the line-of-sight camera 25, the AR display 26, the direction sensor 27, the distance measuring sensor 28, and the motion sensor 29 are provided on the head mount portion. Preferably, at least respective antennas of the ITS communication device 21, the cellular communication device 22, and the positioning device 23 are provided in or on the head mount portion.

In the present embodiment, the pedestrian terminal 1 is configured to allow a user to operate the screen of the virtual smartphone through touch operations on the screen of the virtual smartphone. In other embodiments, the pedestrian terminal 1 may be configured to allow a user to operate the screen of the virtual smartphone through hand gesture actions performed at a location where the screen of the virtual smartphone is not located. This configuration eliminates the need to compare the position of the user's fingertip with that of the screen of the virtual smartphone in the virtual terminal input recognition operation P6, thereby enabling the pedestrian terminal 1 to accurately recognize the user's operation even when the accuracy of position data is low. In some cases, the pedestrian terminal 1 may be configured to allow a user to operate the screen of the virtual smartphone through the movement of the user's eyes, based on the position data of the user's point of regard acquired from images captured by the line-of-sight camera 25 in the point of regard detection operation P8.

Next, an operation procedure of processing operations performed in the pedestrian terminal 1 according to the first embodiment will be described. FIG. 5 is a flow chart showing an operation procedure of processing operations performed in the pedestrian terminal 1.

As shown in FIG. 5(A), the positioning device 23 in the pedestrian terminal 1 first acquires the position data of a user (pedestrian) (ST101). Next, the pedestrian terminal 1 determines whether or not pedestrian information should be transmitted, specifically, whether or not a user has entered a dangerous area (ST102).

When pedestrian information should be transmitted to an in-vehicle terminal (Yes in ST102), the ITS communication device 21 transmit a message containing the pedestrian information (such as pedestrian's ID and position data) to the in-vehicle terminal through pedestrian-to-vehicle communications (ST103).

As shown in FIG. 5(B), when the ITS communication device 21 of the pedestrian terminal 1 receives a message transmitted from a nearby in-vehicle terminal 2 (Yes in ST111), the processor 32 performs a collision determination based on position data of the vehicle and other information included in the message, to thereby determine whether or not there is a risk that the vehicle may collide with the user (ST112).

When determining that there is a risk of collision (Yes in ST112), the processor 32 then acquires position data of the user's point of regard based on images captured by the line-of-sight camera 25 (ST113). Then, the processor 32 determines whether or not the user is looking at the virtual smartphone based on the position of the user's point of regard and the position of the virtual smartphone created in the virtual terminal rendering operation P4 (ST114).

When determining that the user is looking at the virtual smartphone (Yes in ST114), the processor 32 controls the pedestrian terminal 1 to perform a predetermined alert operation to the user (ST115). Specifically, the pedestrian terminal 1 displays an alert screen on the virtual smartphone as the alert operation.

The in-vehicle terminal 2 periodically transmits a message including position data of the in-vehicle terminal 2 through pedestrian-to-vehicle communications in a similar manner to the pedestrian terminal 1 (See FIG. 5 (A)). Furthermore, when receiving a message through pedestrian-to-vehicle communications, the in-vehicle terminal 2 similarly performs the collision determination, and when determining that there is a risk of collision, the in-vehicle terminal 2 provides an alert to the driver in a similar manner to the pedestrian terminal 1 (See FIG. 5 (B)).

Second Embodiment

Figure 6:
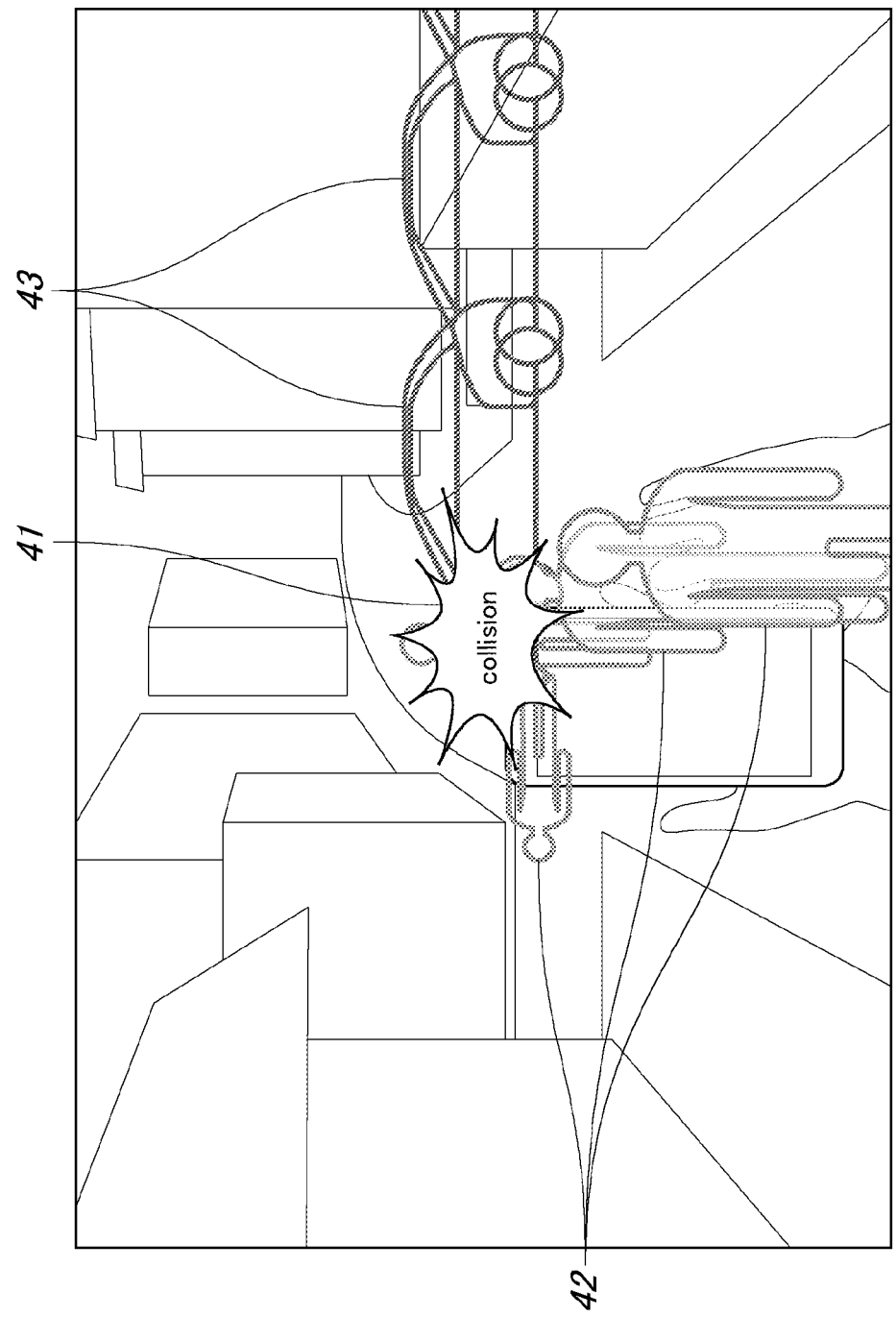
FIG. 6 is an explanatory diagram showing AR contents displayed on a pedestrian terminal 1 according to a second embodiment of the present invention.

Next, a second embodiment of the present invention will be described. Except for what will be discussed here, the second embodiment is the same as the above-described embodiment. FIG. 6 is an explanatory diagram showing AR contents displayed on a pedestrian terminal 1 according to a second embodiment of the present invention.

In the present embodiment, the pedestrian terminal 1 displays a collision point as a virtual object in AR; that is, displays a mark image 41 representing a point at which the collision between a pedestrian and a vehicle is predicted to occur. This enables the pedestrian to recognize a predicted point at which the pedestrian may collide with the vehicle.

In the present embodiment, the pedestrian terminal 1 displays a collision scene as a virtual object in AR; that is, the pedestrian terminal 1 displays simulated images 42 of a pedestrian and simulated images 43 of an vehicle, showing stepwise representation of the collision scene in which the pedestrian and vehicle gradually approach to each other and finally collide. This enables a pedestrian to recognize a predicted situation in which the pedestrian collides with a vehicle.

In the present embodiment, the collision point and the collision scene are displayed in AR. In other embodiments, predicted mobility areas of a pedestrian and a vehicle(s) may be displayed in AR. In this case, each predicted mobility area is displayed in a fan shape extending from the current position toward the collision point.

In the present embodiment, in which the virtual smartphone is displayed in AR, when there is a risk of collision, the pedestrian terminal 1 may stop displaying the virtual smartphone. This configuration enables a user to quickly recognize that some kind of danger is imminent, and also easily see the collision point and the collision scene displayed in AR.

Figure 7:
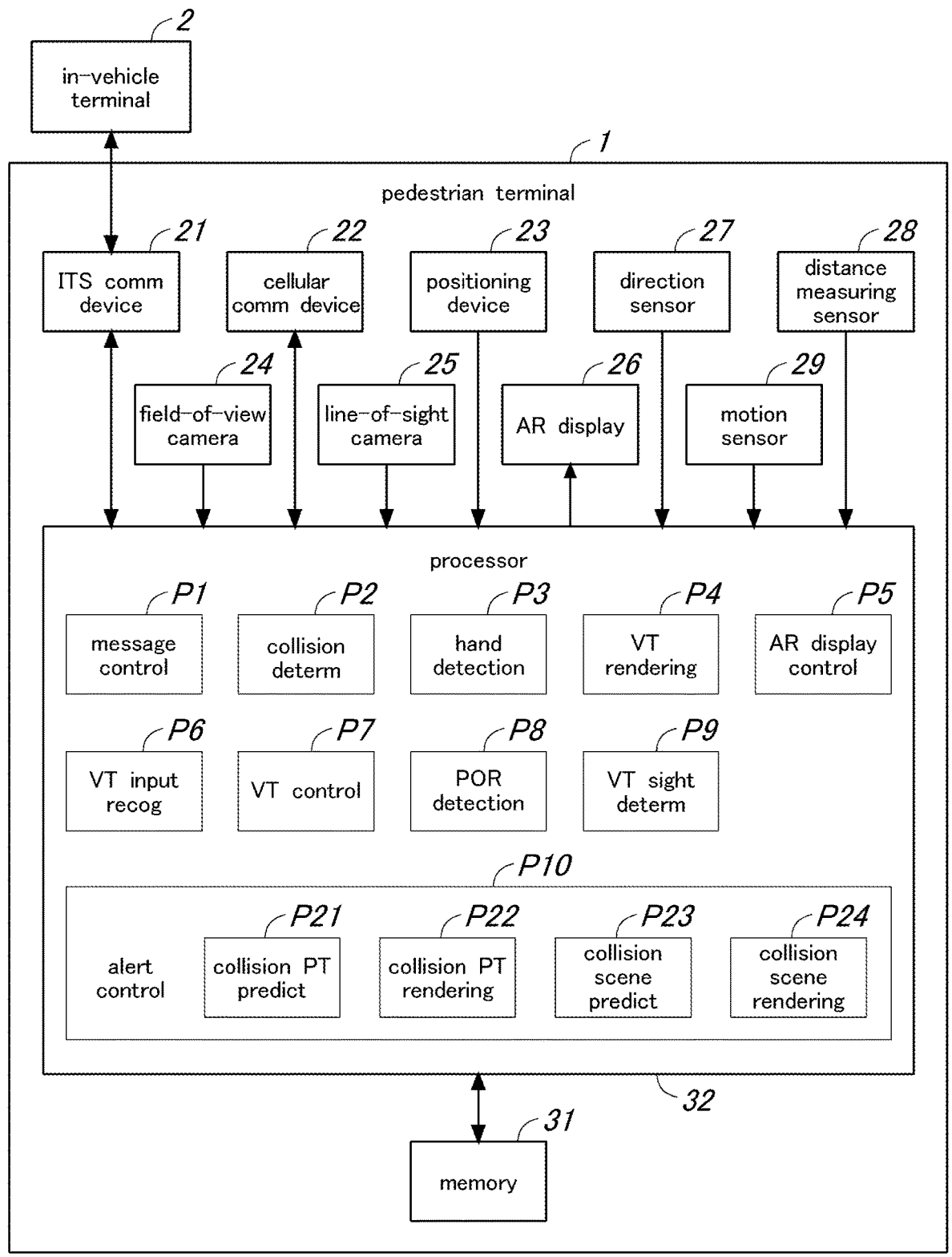
FIG. 7 is a block diagram showing a schematic configuration of the pedestrian terminal 1 according to the second embodiment.
Figure 8:
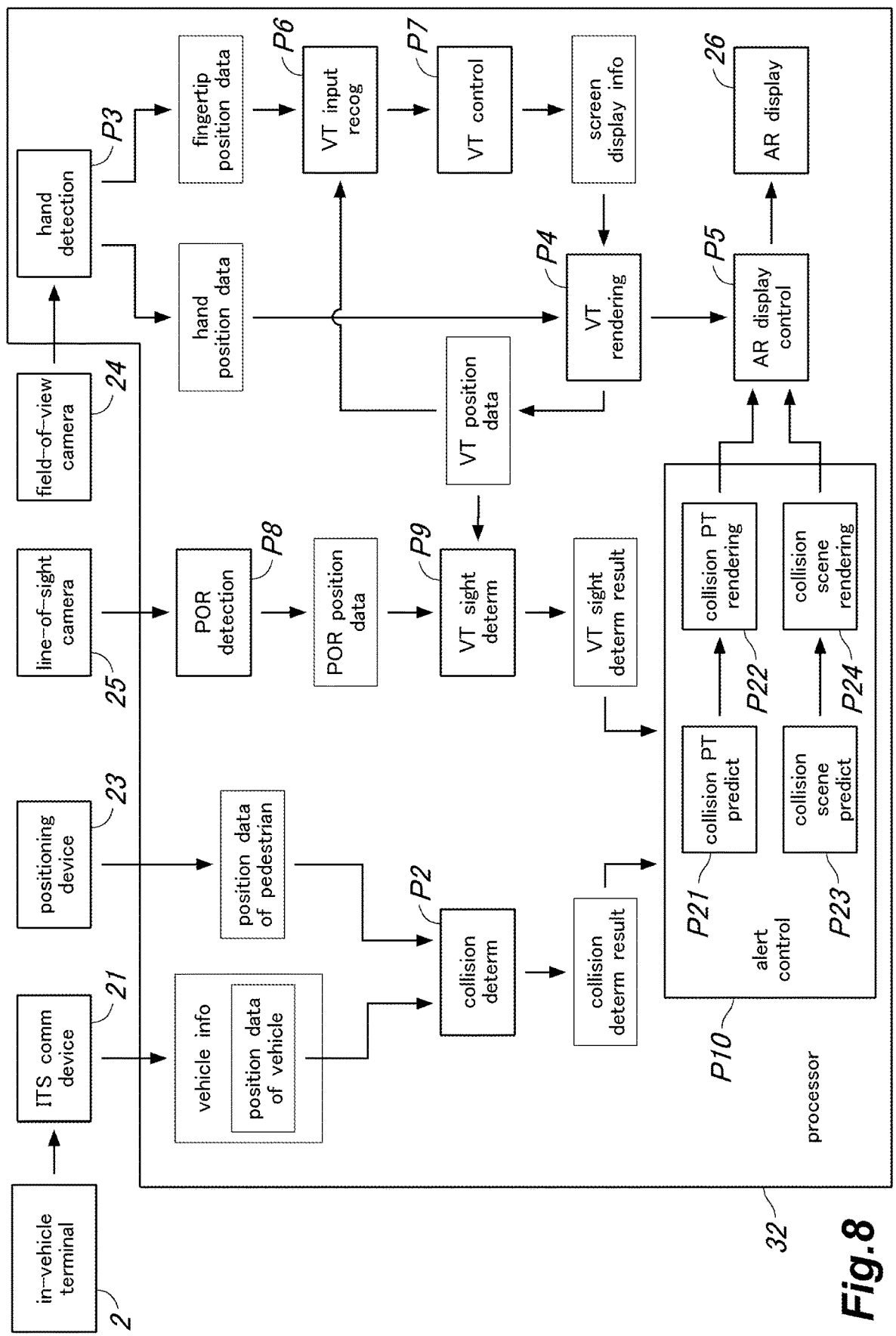
FIG. 8 is an explanatory diagram showing an outline of processing operations performed by a processor 32 of the pedestrian terminal 1 according to the second embodiment.

Next, a schematic configuration of the pedestrian terminal 1 according to the second embodiment will be described. FIG. 7 is a block diagram showing a schematic configuration of the pedestrian terminal 1. FIG. 8 is an explanatory diagram showing an outline of processing operations performed by a processor 32 of the pedestrian terminal 1.

As shown in FIG. 7, in the present embodiment, the processor 32 of the pedestrian terminal 1 performs various processing operations in a similar manner as the first embodiment; that is, the processor 32 performs a message control operation P1, a collision determination operation P2, a hand detection operation P3, a virtual terminal rendering operation P4, an AR display control operation P5, a virtual terminal input recognition operation P6, a virtual terminal control operation P7, a point of regard detection operation P8, a virtual terminal sight determination operation P9, and an alert control operation P10. Particularly in the present embodiment, the processor 32 performs, as the alert control operation P10, a collision point prediction operation P21, a collision point rendering operation P22, a collision scene prediction operation P23, and a collision scene rendering operation P24.

In the collision point prediction operation P21, the processor 32 predicts a collision point; that is, a point at which the collision between a pedestrian and a vehicle is predicted to occur. Specifically, the processor 32 acquires position data (three-dimensional data) of the collision point based on the current position and moving speed of the pedestrian and those of the vehicle.

In the collision point rendering operation P22, the processor 32 generates three-dimensional rendering data of the collision point (i.e., rendering data of images including a mark image 41 representing the collision point at its position in the three-dimensional space) based on the position data of the collision point acquired in the collision point prediction operation P21 and three-dimensional map information representing the surrounding roads.

The three-dimensional map information is included in, for example, a dynamic map (integrated map information) created for automatic driving of a vehicle, and is distributed from a dynamic map management server.

In the collision scene prediction operation P23, the processor 32 predicts a collision scene; that is, a situation in which a pedestrian and a vehicle gradually approach to each other and finally collide. Specifically, the processor 32 acquires position data (three-dimensional data) of the pedestrian and that of the vehicle each time at unit intervals of time (e.g., one second) during the time period from the present time to the collision is predicted to occur. In this processing operation, the processor 32 calculates the position of the pedestrian at each time based on the current position and moving speed of the pedestrian, and also calculates the position of the vehicle at each time based on the current position and moving speed of the vehicle.

In the collision scene rendering operation P24, the processor 32 generates three-dimensional rendering data of the pedestrian and the vehicle at each time in the collision scene based on the position data of the pedestrian and the vehicle at each time; that is, generates rendering data of a simulated image 42 representing the pedestrian at its three-dimensional position at each time and that of a simulated image 43 representing the vehicle at its three-dimensional position at each time. For each time, the processor 32 generates a simulated image 42 representing the pedestrian and a simulated image 43 representing the vehicle as viewed from the user (pedestrian) based on position data of the pedestrian terminal 1.

In the AR display control operation P5, the processor 32 displays the mark image 41 of the collision point in AR based on the 3D rendering data of the collision point acquired in the collision point rendering operation P22. The processor 32 also displays the simulated image 43 representing the vehicle in AR based on the 3D rendering data acquired in the collision scene rendering operation P24; that is, the 3D rendering data of the pedestrian and the vehicle acquired at each time in the collision scene.

Third Embodiment

Figure 9:
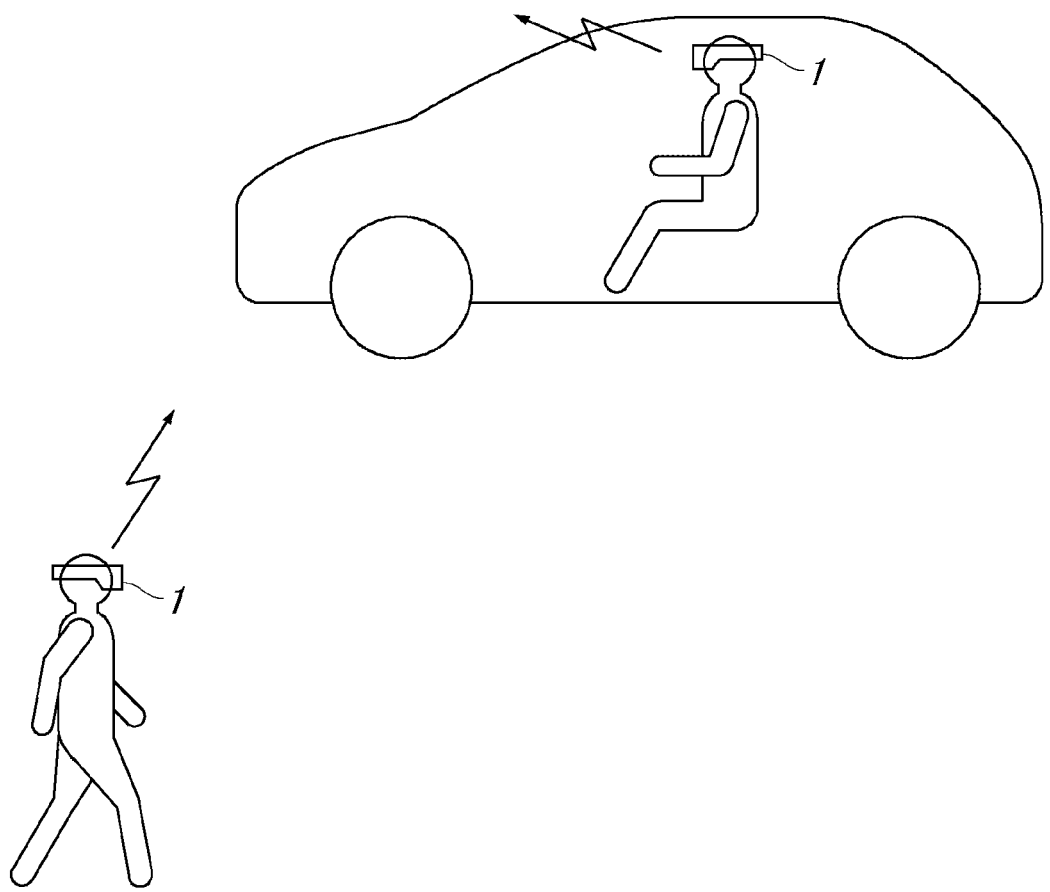
FIG. 9 is a diagram showing a general configuration of a traffic safety assistance system according to a third embodiment of the present invention.

Next, a third embodiment of the present invention will be described. Except for what will be discussed here, the third embodiment is the same as the above-described embodiments. FIG. 9 is a diagram showing a general configuration of a traffic safety assistance system according to a third embodiment of the present invention.

In the above-described embodiments, a pedestrian terminal 1 and an in-vehicle terminal 2 exchange information with each other through ITS communications (pedestrian-to-vehicle communications) to support pedestrian's safety confirmation. In the present embodiment, when a user of the pedestrian terminal 1 gets in a vehicle as a driver of the vehicle, the pedestrian terminal 1 worn by the driver transitions to an in-vehicle terminal mode to operate as an in-vehicle terminal 2, and exchanges information with pedestrian terminals 1 carried by nearby pedestrians through ITS communications, to thereby support safe driving of the driver of the vehicle.

Figure 10:
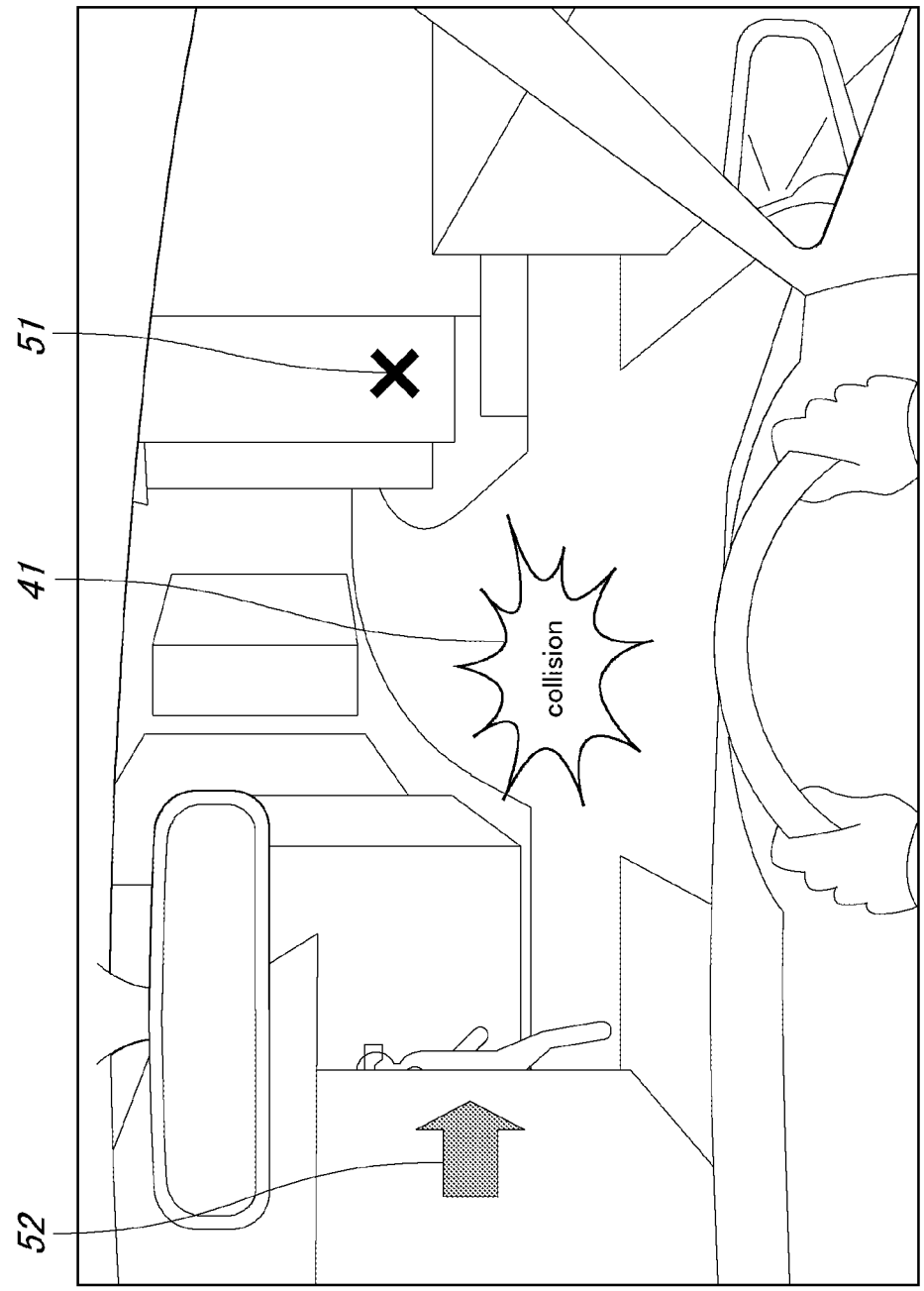
FIG. 10 is an explanatory diagram showing AR contents displayed on a pedestrian terminal 1 according to the third embodiment.

Next, AR contents displayed on a pedestrian terminal 1 according to the third embodiment will be described. FIG. 10 is an explanatory diagram showing AR contents displayed on a pedestrian terminal 1.

When the pedestrian terminal 1 transitions to the in-vehicle terminal mode, the pedestrian terminal 1 operates as an in-vehicle terminal 2. When there is a risk that the vehicle may collide with a nearby pedestrian, the AR display 26 provides an alert to the driver. In the present embodiment, the pedestrian terminal 1 displays a mark image 51 ("X" mark image) in AR as an alert operation, the mark image 51 representing a point of regard of a pedestrian, i.e., a point which a pedestrian is looking at. This configuration allows the driver to clearly recognize in which direction the pedestrian is looking.

In the present embodiment, the pedestrian terminal 1 displays a mark image 52 (arrow mark image) representing the current position of a pedestrian having a risk of collision. As a result, even when a user cannot quickly recognize the pedestrian having the risk of collision because of an out-of-sight condition such as an intersection, the pedestrian terminal 1 can guide the line of sight of the user (driver) to the pedestrian having the risk of collision, enabling the user to quickly recognize the pedestrian having the risk of collision.

In the example shown in FIG. 10, the pedestrian terminal 1 displays the mark image 41 representing the collision point in AR in a similar manner to the second embodiment (see FIG. 6). As in the second embodiment, the pedestrian terminal 1 may display a simulated image 42 of the pedestrian and a simulated image 43 of the vehicle, showing the collision scene.

In the present embodiment, the pedestrian terminal 1 is configured to display the point-of-regard mark image 51 in AR as an image representing the direction of the line of sight of a person. In other embodiments, the pedestrian terminal 1 may display the line of sight (line segment) connecting the head of a person to the person's point of regard in AR as an image representing the direction of the line of sight of the person.

Figure 11:
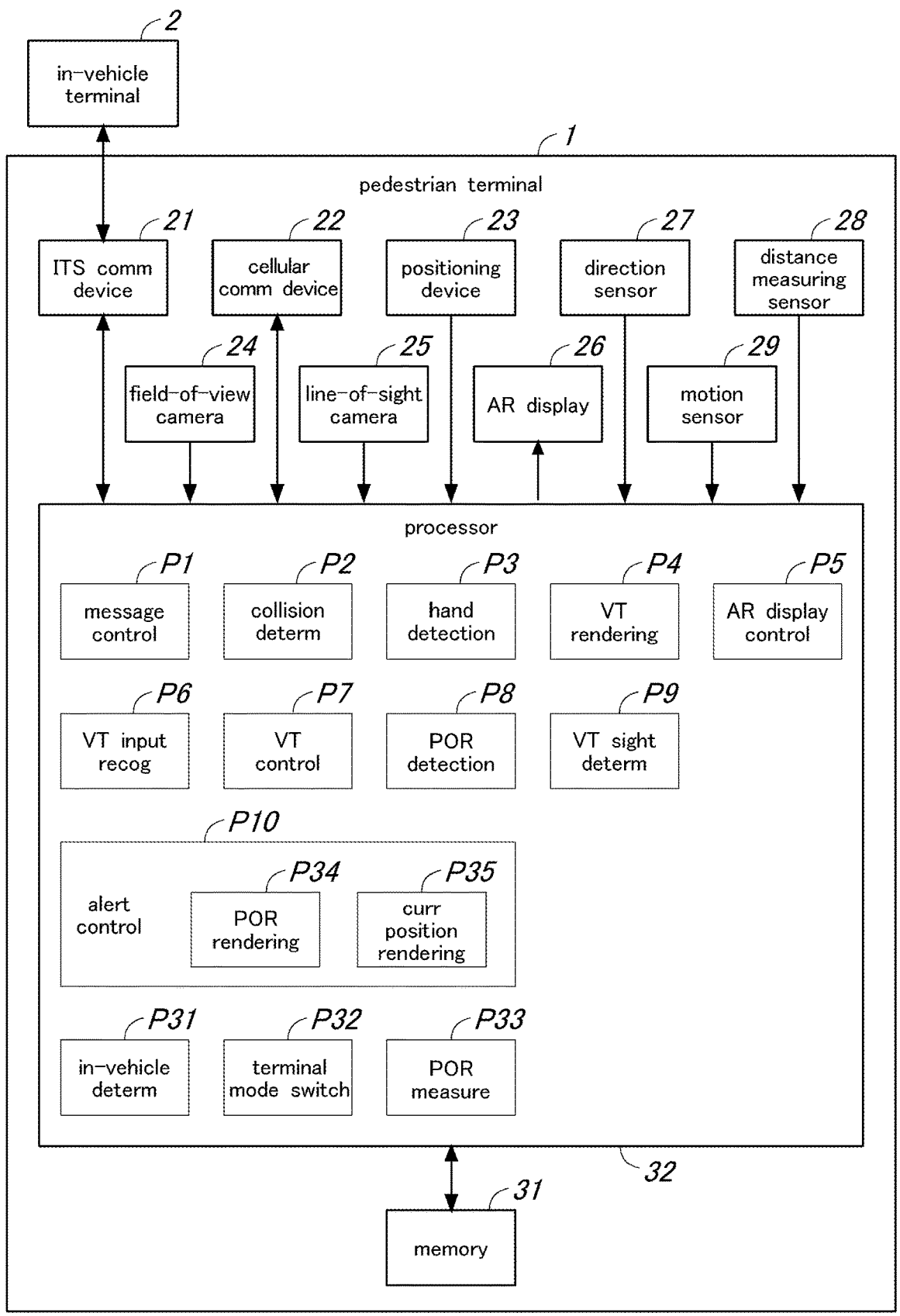
FIG. 11 is a block diagram showing a schematic configuration of the pedestrian terminal 1 according to the third embodiment.
Figure 12:
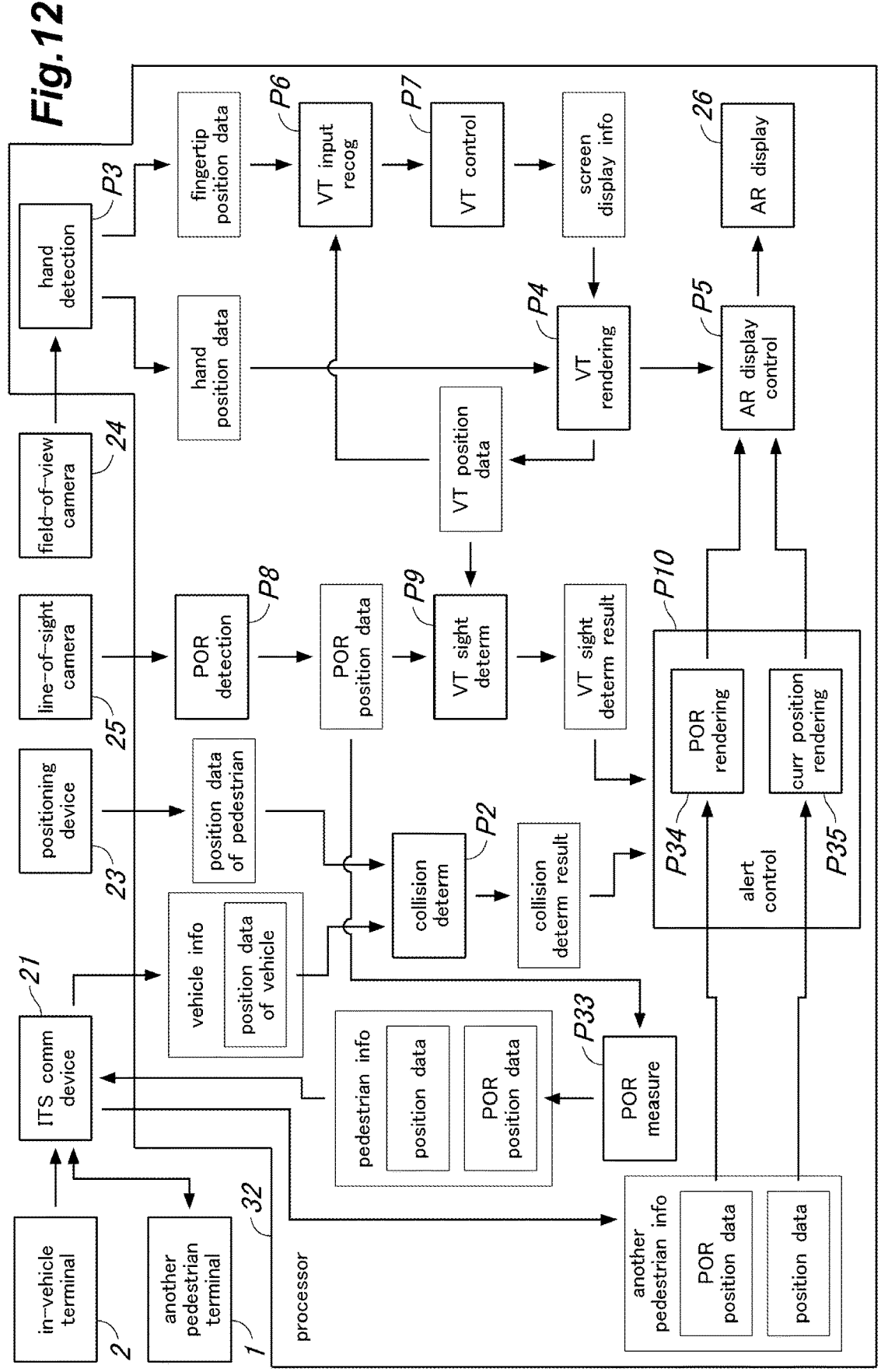
FIG. 12 is an explanatory diagram showing an outline of processing operations performed by a processor 32 of the pedestrian terminal 1 according to the third embodiment.

Next, a schematic configuration of the pedestrian terminal 1 according to the third embodiment will be described. FIG. 11 is a block diagram showing a schematic configuration of the pedestrian terminal 1. FIG. 12 is an explanatory diagram showing an outline of processing operations performed by the processor 32 of the pedestrian terminal 1.

As shown in FIG. 11, in the present embodiment, the processor 32 of the pedestrian terminal 1 performs various processing operations in a similar manner as the first embodiment; that is, the processor 32 performs a message control operation P1, a collision determination operation P2, a hand detection operation P3, a virtual terminal rendering operation P4, an AR display control operation P5, a virtual terminal input recognition operation P6, a virtual terminal control operation P7, a point of regard detection operation P8, a virtual terminal sight determination operation P9, and an alert control operation P10. In the present embodiment, the processor 32 further performs an in-vehicle determination operation P31 and a terminal mode switching operation P32.

In the in-vehicle determination operation P31, the processor 32 determines whether or not the pedestrian terminal 1 is located in a vehicle; that is, whether or not a user of the pedestrian terminal 1 has gotten in the vehicle as a driver. Specifically, the processor 32 determines that the pedestrian terminal 1 is inside the vehicle based on, for example, measurements of radio signals from satellites acquired by the positioning device 23. In some cases, the processor 32 may determine that the pedestrian terminal 1 is inside the vehicle by detecting the user's motion of seating in the vehicle based on detection information provided from the motion sensor 29. In other cases, the processor 32 may determine that the pedestrian terminal 1 is inside the vehicle by receiving a beacon signal transmitted from a transmitter installed in the vehicle.

In the terminal mode switching operation P32, based on the determination result of the in-vehicle determination operation P31, the processor 32 switches the operation mode of the pedestrian terminal 1 between the normal mode and the in-vehicle terminal mode in which the pedestrian terminal 1 operates as an in-vehicle terminal. Specifically, when the pedestrian terminal 1 is outside the vehicle; that is, when a user of the pedestrian terminal 1 is walking outside, the processor 32 operates in the normal mode, and when the pedestrian terminal 1 is located in the vehicle; that is, when the user has gotten in the vehicle as a driver, the processor 32 switches the operation mode to the in-vehicle terminal mode.

Furthermore, in the present embodiment, the processor 32 performs a point of regard measurement operation P33 when the pedestrian terminal 1 is in the normal mode. When the pedestrian terminal 1 is in the in-vehicle terminal mode, the processor 32 performs, as the alert control operation P10, a point of regard rendering operation P34 and a current position rendering operation P35.

As shown in FIG. 12, in the point of regard measurement operation P33, the processor 32 measures the point of regard of a pedestrian based on the point of regard position data (coordinate values of the point of regard in a coordinate system defined on the pedestrian's field of view) acquired in the point of regard detection operation P8 and the three-dimensional map information, and then the processor 32 acquires the position data (three-dimensional position data) of the point of regard.

In the point of regard rendering operation P34, the processor 32 generates rendering data of the pedestrian's point of regard based on the point of regard position data included in the pedestrian information acquired from the pedestrian terminal 1 and the three-dimensional map information.

In the current position rendering operation P35, the processor 32 generates rendering data of the current position of the pedestrian, particularly, rendering data of an arrow image pointing to the current position of the pedestrian based on the pedestrian's position data included in the pedestrian information acquired from the pedestrian terminal 1 and the three-dimensional map information.

In the AR display control operation P5, the processor 32 displays the mark image 51 of the point of regard in AR based on the rendering data of the point of regard acquired in the point of regard rendering operation P34. The processor 32 also displays the mark image 52 (arrow image) pointing to the current position of the pedestrian in AR based on the rendering data of the current position of the pedestrian acquired in the current position rendering operation P35.

In the present embodiment, the mark image 52 for guiding the driver's line of sight to the position of a pedestrian having a risk of collision is displayed in AR to provide an alert to the driver. In other embodiments, a mark image for guiding a pedestrian's s line of sight to the position of a vehicle having a risk of collision may be displayed in AR to provide an alert to the pedestrian. In some cases, a mark image for guiding the line of sight of a pedestrian or a driver to the position of a dangerous point (e.g., a collision point) may be displayed in AR to provide an alert to the pedestrian or the driver.

Not only in the case of an out of sight condition such as at an intersection, but also in the case of poor visibility such as poor visibility caused by snow or fog, a mark image for guiding the line of sight of a pedestrian or a driver to the position of an object (pedestrian or vehicle) having a risk of collision and/or the position of a dangerous point (e.g., a collision point) may be displayed in AR. In this case, the processor 32 may detect a condition of poor visibility based on images captured by the field-of-view camera 24 and the three-dimensional map information.

Figure 13:
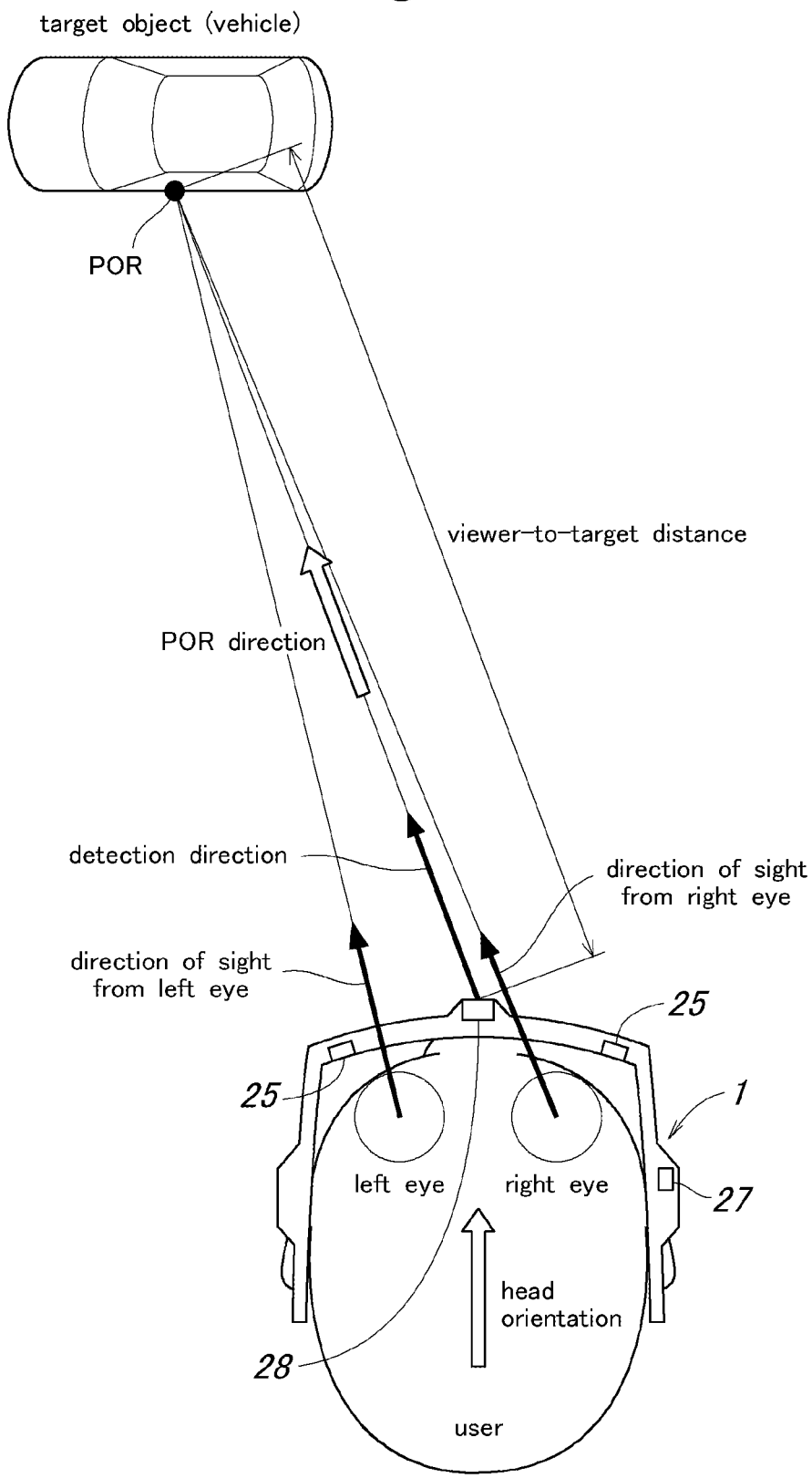
FIG. 13 is an explanatory diagram showing an outline of a point of regard detection operation P8 and a point of regard measurement operation P33 performed in the pedestrian terminal 1 according to the third embodiment.

Next, a point of regard detection operation P8 and a point of regard measurement operation P33 performed in the pedestrian terminal 1 of the third embodiment will be described. FIG. 13 is an explanatory diagram showing an outline of a point of regard detection operation P8 and a point of regard measurement operation P33 performed in the pedestrian terminal 1.

The pedestrian terminal 1 includes the line-of-sight camera(s) 25, the AR display 26, the direction sensor 27, and the distance measuring sensor 28. The processor 32 of the pedestrian terminal 1 performs the point of regard detection operation P8 and the point of regard measurement operation P33 (see FIGS. 11 and 12).

In the point of regard detection operation P8, the processor 32 detects the directions of the left and right eyeballs of a user based on images captured by the left and right line-of-sight camera(s) 25 to acquire the user's line-of-sight direction. Since the directions of the lines of sight (directions of lines of sight from the respective eyeballs) differs between the right eye and the left eye, the pedestrian terminal 1 may be configured to acquire the point of regard at which the lines of sight of the right and left eyes intersect based on the directions of lines of sight from the right eye and the left eye and the distance therebetween, and then determine the direction towards the point of regard as a direction of the user's line-of-sight.

In the point of regard measurement operation P33, the processor 32 first measures the distance (viewer-to-target distance) from a user to the object (target object) which the user is looking at based on the directions of lines of sight from the left and right eyes acquired in the point of regard detection operation P8 and the detection result of the distance measuring sensor 28 (viewer-to-target distance measurement operation).

In the present embodiment, the distance measuring sensor 28 is configured such that its detection direction is adjustable. When the pedestrian terminal 1 measures the viewer-to-target distance, after the detection direction of the distance measuring sensor 28 is adjusted so as to be in line with the line-of-sight direction of the user based on the user's line-of-sight direction acquired in the point of regard detection operation P8, the pedestrian terminal 1 uses the distance measuring sensor 28 to detect the distance to the opposite object, thereby measuring the distance to the object which the user is looking at (viewer-to-target distance).

In the present embodiment, the pedestrian terminal 1 measures the viewer-to-target distance by pointing the distance measuring sensor 33 in the line-of-sight direction of the user. However, the pedestrian terminal 1 may estimate the viewer-to-target distance based only on the directions of lines of sight from the left and right eyes (movement of the eyes) acquired from images captured by the left and right line-of-sight cameras 25 in the point of regard detection operation P8. Specifically, the pedestrian terminal 1 can estimate the viewer-to-target distance based on the characteristics that an increase in the viewer-to-target distance decreases the convergence angle at which the directions of lines of sight from the left and right eyes intersect, and a decrease in the viewer-to-target distance increases the convergence angle.

In the point of regard measurement operation P33, the processor 32 then acquires the position data (latitude, longitude) of the point of regard. i.e., a point the user is looking at, based on the orientation of the user's head (head orientation) acquired by the direction sensor 27, the directions of lines of sight from the user's eyes acquired by the point of regard detection operation P8, and the viewer-to-target distance acquired in the viewer-to-target distance measurement operation. Specifically, the processor 32 calculates the orientation towards the point of regard (point of regard direction) based on the user's head orientation and the line-of-sight direction. In other words, the point of regard direction is defined as a direction deviated by the line-of-sight direction from the head orientation. Then, the processor 32 acquires the position data (latitude, longitude) of the point of regard based on the position of the user, the user's point of regard direction, and the viewer-to-target distance.

Figure 14:
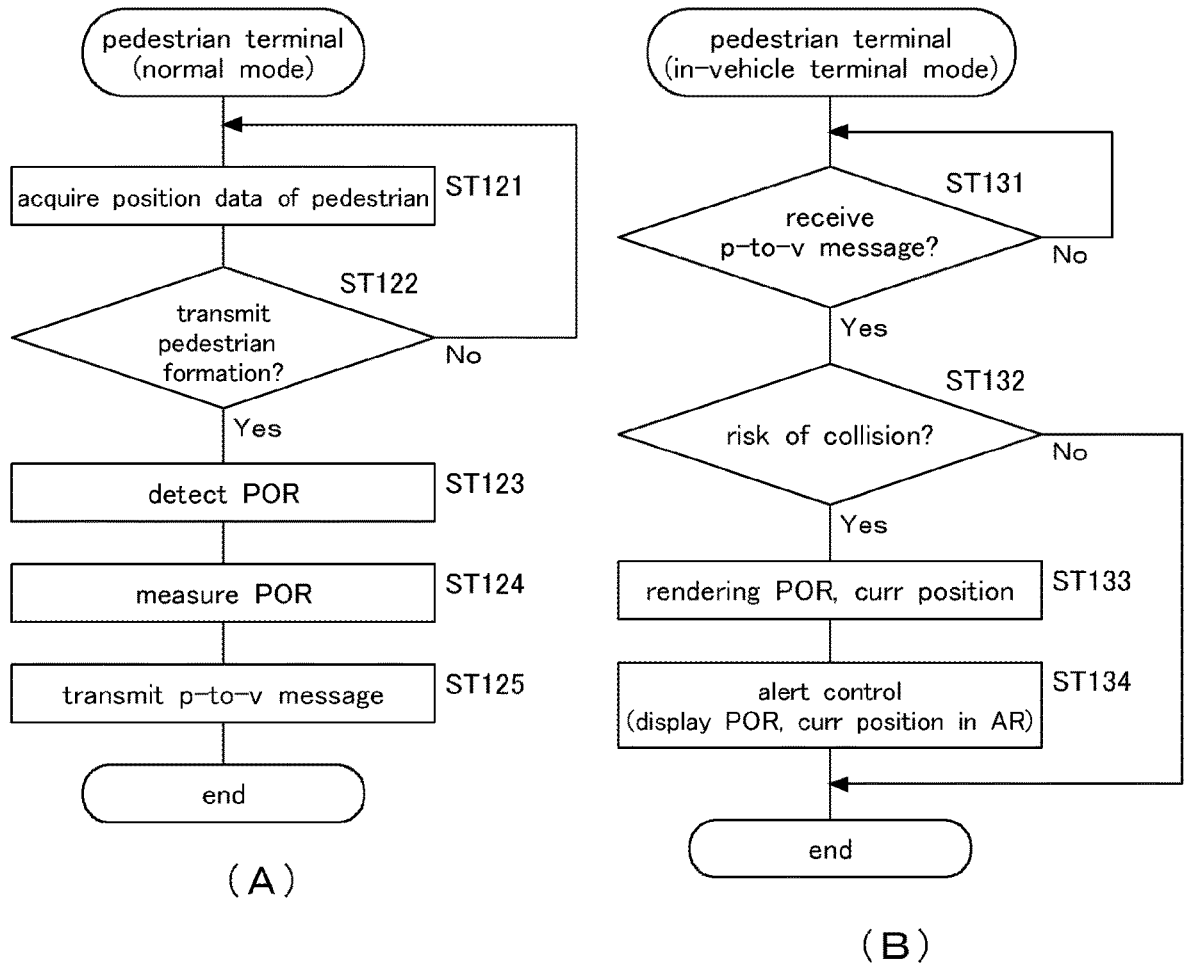
FIG. 14 is a flow chart showing an operation procedure of processing operations performed in the pedestrian terminal 1 according to the third embodiment.

Next, an operation procedure of processing operations performed in the pedestrian terminal 1 of the third embodiment will be described. FIG. 14 is a flow chart showing an operation procedure of processing operations performed in the pedestrian terminal 1.

As shown in FIG. 14(A), in the case of the pedestrian terminal 1 which operates in the normal mode; that is, operates while a user is walking, the positioning device 23 acquires the position data of the pedestrian (user) (ST121). Next, the pedestrian terminal 1 determines whether or not pedestrian information should be transmitted, specifically, whether or not the user has entered a dangerous area (ST122).

When pedestrian information should be transmitted to an in-vehicle terminal (Yes in ST122), the processor 32 detects the user's point of regard based on images of the line-of-sight cameras 25, and acquires the position data of the user's point of regard (ST123). Next, the processor 32 measures the point of regard which the pedestrian is looking at based on the point of regard position data and the three-dimensional map information, and acquires the point of regard position data (ST124). Then, the ITS communication device 21 transmit a message containing the pedestrian information (such as the pedestrian's ID, position data, and point of regard position data) to the in-vehicle terminal through pedestrian-to-vehicle communications (ST125).

As shown in FIG. 14(B), in the case of the pedestrian terminal 1 which operates in the in-vehicle terminal mode; that is, operates while a user is in a vehicle as a driver, when the ITS communication device 21 of a pedestrian terminal 1 receives a message transmitted from a nearby pedestrian terminal 1 (Yes in ST131), the processor 32 performs a collision determination based on position data of the pedestrian and other information included in the message to thereby determine whether or not there is a risk that the vehicle will collide with the pedestrian (ST132).

When determining that there is a risk of collision (Yes in ST132), the processor 32 then generates rendering data of the pedestrian's point of regard and the current position based on the pedestrian's position data and the pedestrian's point of regard position data included in the pedestrian information acquired from the pedestrian terminal 1, and three-dimensional map information (ST133). Next, as an alert operation, the processor 32 displays a mark image 51 of the point of regard and a mark image 52 of the current position in AR based on the rendering data of the pedestrian's point of regard and the current position.

In the present embodiment, an in-vehicle terminal 2 is not mounted in the vehicle in which the user of the pedestrian terminal 1 is present. In cases where an in-vehicle terminal 2 is mounted in the vehicle, the in-vehicle terminal 2 stops operating while the pedestrian terminal 1 operates as an in-vehicle terminal. Alternatively, in such cases, the pedestrian terminal 1 in the in-vehicle terminal mode may cooperate with the in-vehicle terminal 2 in the vehicle to perform the necessary operations.

In the present embodiment, when operating in the in-vehicle terminal mode, the pedestrian terminal 1 displays an image (point-of-regard mark image 51) representing the direction of sight of a nearby pedestrian in AR. However, even when a user is walking, the pedestrian terminal 1 may display an image representing the direction of sight of the driver of a nearby vehicle in AR. In other cases, the pedestrian terminal 1 in the in-vehicle terminal mode may also display an image representing the direction of sight of the driver of a nearby vehicle in AR.

In the present embodiment, the pedestrian terminal 1 displays a mark image representing a collision point and a simulated image of a pedestrian or a vehicle as virtual objects to provide an alert to a user. In some cases, the pedestrian terminal 1 may display, as a virtual object in AR, a simulated image of an obstacle (such as a pit, a fence, or a wall) in front of the user. In other cases, the pedestrian terminal 1 may display, as a virtual object in AR, a simulated image of the road surface, on which the user is moving, and which is modified to look as if it were in a dangerous state. For example, the pedestrian terminal 1 may display a simulated image showing a road surface having a different color from that of the actual one, or a simulated image showing a road surface in an uneven state. This configuration encourages the user to intuitively hesitate to move forward and to take risk-avoidance actions such as stopping in a reflexive manner.

In the present embodiment, the pedestrian terminal 1 displays a mark image in AR for guiding the line of sight of a pedestrian or a driver to the position of an object (pedestrian or vehicle) having a risk of collision and/or the position of a dangerous point (e.g., a collision point) in the case of an out of sight condition such as an intersection or poor visibility. However, in such cases, the pedestrian terminal 1 may display, instead of the mark image, a simulated image of a pedestrian or a simulated image of a vehicle in AR. In this case, a simulated image of a pedestrian or a vehicle is preferably an image showing only the shape of the pedestrian or vehicle so as not to block the user's view more than requires.

In the present embodiment, the pedestrian terminal 1 displays a simulated image of a pedestrian or a vehicle having a risk of collision as a virtual object. In other embodiments, the pedestrian terminal 1 may display, as a virtual object, a simulated image of a person or a device for effectively supporting the pedestrian's safety confirmation. For example, the pedestrian terminal 1 displays, as a virtual object in AR, a simulated image which shows a person who guides traffic to a safe area (such as a crossing guard who guides children going to school, and a police officer who guides traffic). Furthermore, the pedestrian terminal 1 may display, as a virtual object in AR, a simulated image which shows a traffic light which looks larger than the actual one. This configuration allows the user to pay more attention to the display of the traffic light.

In the present embodiment, the pedestrian terminal 1 displays, as a virtual object, a mark image representing a collision point and a simulated image of a pedestrian or a vehicle to provides an alert to a user. In some cases, the pedestrian terminal 1 may display, as a virtual object in AR, a masking image for masking the user's field of view except for an object having a risk of collision (pedestrian or vehicle) or a dangerous point (e.g., a collision point). This configuration allows a user to see only dangerous points and objects, thereby having the user focus on such dangerous points and objects. In this case, the masking image can be one filled with a predetermined color (such as black or gray). In some cases, the masking image may be displayed in a semi-transparent state.

In the present embodiment, when determining that there is a risk of collision based on information acquired through pedestrian-to-vehicle communications, the pedestrian terminal 1 displays an image in AR to provide an alert. In some cases, when detecting that a pedestrian has entered a dangerous area (near an intersection or an area in an out of sight condition) based on map information, the pedestrian terminal 1 may display an image in AR to provide an alert to the pedestrian. Preferably, when detecting that a pedestrian enters a dangerous area, the pedestrian terminal 1 prohibits the pedestrian from using the virtual smartphone, and when detecting that the pedestrian has moved out of a dangerous area, the pedestrian terminal 1 allows the pedestrian to use the virtual smartphone.

When a plurality of pedestrians are walking in a row, the pedestrians including a first pedestrian and a second pedestrian in front of the first pedestrian, the first pedestrian's view is sometimes blocked by the second pedestrian resulting in that the first pedestrian cannot to see a dangerous point or object. In view of this problem, their pedestrian terminals 1 may be configured such that a second pedestrian terminal carried by the second pedestrian terminal captures images with its FOC camera 24 and transmits a massage containing the images to a first pedestrian terminal 1 carried by the first pedestrian terminal 1 through ITS communications (pedestrian-to-pedestrian communications), and that the first pedestrian terminal 1 generates, from the images transmitted from the second pedestrian terminal 1, images in which the second pedestrian is shown in a transparent state, and displays the generated images in AR. Since the first pedestrian's failure to recognize that there is the second pedestrian can lead to a dangerous situation, it is more preferable that the first pedestrian terminal 1 generates images in which the second pedestrian is shown in a semi-transparent state or that the shape of the second pedestrian is shown in a broken line. In addition, since the field of view of the first pedestrian is different from that of the second pedestrian, the first pedestrian terminal may correct the difference in vision of images transmitted from the second pedestrian terminal.

Specific embodiments of the present invention are described herein for illustrative purposes. However, the present invention is not limited to those specific embodiments, and various changes, substitutions, additions, and omissions may be made for features of the embodiments without departing from the scope of the invention. In addition, elements and features of the different embodiments may be combined with each other to yield an embodiment which is within the scope of the present invention.

INDUSTRIAL APPLICABILITY

A pedestrian device and a traffic safety assistance method according to the present disclosure can effectively and properly support pedestrian's safety confirmation by utilizing vehicle-to-pedestrian communications and an AR device, and are useful as a pedestrian device for exchanging information with an in-vehicle device to support safety of a pedestrian and a vehicle, and a traffic safety assistance method utilizing the pedestrian device.

GLOSSARY

1 pedestrian terminal (pedestrian device)
2 in-vehicle terminal (in-vehicle device)
21 ITS communication device (pedestrian-to-vehicle communication device)
22 cellular communication device
23 positioning device
24 field-of-view camera
25 line-of-sight camera
26 AR display
31 memory
32 processor

The invention claimed is:
1. A pedestrian device comprising:
a pedestrian-vehicle communication device for exchanging information with an in-vehicle device mounted in a vehicle via vehicle-to-pedestrian communications;
an AR display for displaying a virtual object(s) overlaid on a real space which can be seen by a user of the pedestrian device; and
a processor configured to:
determine if there is a risk of collision with the vehicle based on the information transmitted to and received from the in-vehicle device; and
when determining that there is a risk of collision, control display of the virtual object(s) on the AR display as an alert operation to provide an alert to the user, wherein the display of the virtual object(s) on the AR display comprises simulated images of the user and the vehicle, showing stepwise representation of a collision scene in which the user and the vehicle gradually approach each other and finally collide.

2. The pedestrian device according to claim 1, further comprising a field-of-view camera for capturing the user's field of view,
wherein the processor is configured to:
detect a palm and a fingertip of the user from an image captured by the field-of-view camera;
display a virtual terminal as the virtual object at a position of the user's palm; and
detect the user's screen operation on the virtual terminal based on positions of the fingertip of the user, and control a screen displayed on the virtual terminal in response to the screen operation.

3. The pedestrian device according to claim 2, further comprising a line-of-sight camera for capturing an eyeball of the user,
wherein the processor is configured to:
acquire position data of a point of regard of the user from an image captured by the line-of-sight camera;
determine whether or not the user is looking at the virtual terminal based on the position data of the point of regard;
when determining that there is a risk of collision and that the user is looking at the visual terminal, performs the alert operation to provide an alert to the user.

4. The pedestrian device according to claim 1, wherein the processor is configured to, when determining that there is a risk of collision, predict a collision point where the collision is predicted to occur, and the display of the stepwise representation includes a mark image representing the collision point as the virtual object.

5. The pedestrian device according to claim 1, wherein the processor is configured to display at least one of a mark image and a simulated image representing a position of the vehicle having a risk of collision as the virtual object(s).

6. The pedestrian device according to claim 1, wherein, when detecting that the user has gotten in a vehicle as a driver, the processor transitions to an in-vehicle terminal mode and controls the display of the virtual object(s) so as to support safe driving of the driver.

7. The pedestrian device according to claim 6, wherein the pedestrian-vehicle communication device is configured to receive information on a direction of line of sight of s nearby pedestrian from a pedestrian device carried by the nearby pedestrian, and
wherein the processor is configured to display an image representing the direction of the line of sight of the nearby pedestrian as the virtual object based on the information on the direction of the line of sight of the nearby pedestrian.

8. The pedestrian device according to claim 6, wherein the processor is configured to display at least one of a mark image and a simulated image representing a position of a pedestrian having a risk of collision as the virtual object(s).

9. The pedestrian device according to claim 1, wherein the pedestrian-vehicle communication device is configured to receive information on a direction of line of sight of a driver of a nearby vehicle from the in-vehicle device mounted therein, and
wherein the processor is configured to display an image representing the direction of the line of sight of the nearby driver as the virtual object based on the information on the direction of the line of sight of the nearby driver.

10. A traffic safety assistance method for exchanging information between a pedestrian device and an in-vehicle device to support safety of a pedestrian and a vehicle, the traffic safety assistance method comprising:
determining, by the pedestrian device, if there is a risk of collision between the vehicle and the pedestrian based on information transmitted to and received from the in-vehicle device, and
when determining that there is a risk of collision, controlling, by the pedestrian device, display of a virtual object on an AR display, wherein the AR display displays the virtual object overlaid on a real space which can be seen by the pedestrian which is a user of the pedestrian device, wherein the AR display displays simulated images of the pedestrian and the vehicle, showing stepwise representation of a collision scene in which the pedestrian and the vehicle gradually approach each other and finally collide.

11. The traffic safety assistance method according to claim 10, comprising:
acquiring three-dimensional position data of the pedestrian and of the vehicle each time at unit intervals of time during a time period from a current time to when the collision is predicted to occur, and
generating three-dimensional rendering data of the pedestrian and the vehicle at each time in the collision scene based on the three-dimensional position data to display the simulated images of the pedestrian and the vehicle at each time.

12. The traffic safe assistance method according to claim 11, wherein the three-dimensional position data are calculated based on current positions and moving speeds of the pedestrian and the vehicle.

13. The traffic safe assistance method according to claim 10, comprising:
displaying predicted mobility areas of the pedestrian and the vehicle in the display of the stepwise representation, wherein the predicted mobility area is displayed in a fan shape extending from a current position of the pedestrian or the vehicle to a collision point where the collision is predicted to occur.

14. The traffic safe assistance method according to claim 10, comprising:
displaying a mark image corresponding to a position of the vehicle having a risk of collision in case the vehicle is currently out of sight of the pedestrian.

15. The pedestrian device according to claim 1, wherein the processor is configured to:
acquire three-dimensional position data of the user and of the vehicle each time at unit intervals of time during a time period from a current time to when the collision is predicted to occur, and
generate three-dimensional rendering data of the user and the vehicle at each time in the collision scene based on the three-dimensional position data to display the simulated images of the user and the vehicle at each time.

16. The pedestrian device according to claim 15, wherein the processors is configured to calculate the three-dimensional position data based on current positions and moving speeds of the user and the vehicle.

17. The pedestrian device according to claim 1, wherein the processor is configured to display predicted mobility areas of the user and the vehicle in the display of the stepwise representation.

18. The pedestrian device according to claim 17, wherein the predicted mobility area is displayed in a fan shape extending from a current position of the user or the vehicle to a collision point where the collision is predicted to occur.

19. The pedestrian device according to claim 1, wherein the processor is configured to display a mark image corresponding to a position of the vehicle having a risk of collision in case the vehicle is currently out of sight of the user.

20. The pedestrian device according to claim 19, further comprising a field-of-view camera for capturing the user's field of view,
   wherein the processor is configured to detect the vehicle which is currently out of sight of the user based on an image captured by the field-of view camera and three-dimensional map information, and
   wherein the mark image corresponding to the position of the vehicle having a risk of collision is configured to guide the user's line of sight to the position of the vehicle at a collision point where the collision is predicted to occur.

* * * * *